US012327445B1

(12) United States Patent
Eberhardt et al.

(10) Patent No.: US 12,327,445 B1
(45) Date of Patent: Jun. 10, 2025

(54) ARTIFICIAL INTELLIGENCE INSPECTION ASSISTANT

(71) Applicant: Samsara Inc., San Francisco, CA (US)

(72) Inventors: Sven Eberhardt, Seattle, WA (US); Brian Westphal, Livermore, CA (US); John Bicket, San Francisco, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/624,609

(22) Filed: Apr. 2, 2024

(51) Int. Cl.
*G07C 5/08* (2006.01)

(52) U.S. Cl.
CPC .................................. *G07C 5/0825* (2013.01)

(58) Field of Classification Search
CPC .................................................... G07C 5/0825
See application file for complete search history.

(56) References Cited

U.S. PATENT DOCUMENTS 4,671,111 A 6/1987 Lemelson
5,825,283 A 10/1998 Camhi
5,917,433 A 6/1999 Keillor et al.
6,064,299 A 5/2000 Lesesky et al.
6,098,048 A 8/2000 Dashefsky et al.
6,157,864 A 12/2000 Schwenke et al.
6,253,129 B1 6/2001 Jenkins et al.
6,317,668 B1 11/2001 Thibault et al.
6,411,203 B1 6/2002 Lesesky et al.
6,421,590 B2 7/2002 Thibault
6,452,487 B1 9/2002 Krupinski
6,505,106 B1 1/2003 Lawrence et al.
6,651,063 B1 11/2003 Vorobiev
6,714,894 B1 3/2004 Tobey et al.
6,718,239 B2 4/2004 Rayner
6,741,165 B1 5/2004 Langfahl et al.
(Continued)

FOREIGN PATENT DOCUMENTS

CN 111047179 A 4/2020
DE 10 2004 015 221 A1 10/2005
(Continued)

OTHER PUBLICATIONS

US 11,450,210 B2, 09/2022, Tsai et al. (withdrawn)
(Continued)

*Primary Examiner* — Behrang Badii
(74) *Attorney, Agent, or Firm* — Knobbe, Martens, Olson & Bear, LLP

(57) ABSTRACT

An inspection application may display, on a user device, a user interface including at least a portion of a vehicle inspection report including a plurality of inspection categories. The inspection application may configure the user device to obtain inspection information associated with a vehicle, the inspection information comprising photographs, videos, audio, and/or text. The inspection application and/or a network-accessible inspection assistant system may generate a prompt including at least a portion of the inspection information and information indicating potential vehicle defects. The prompt may be transmitted to a large language model that returns a response indicating any potential vehicle defects identified in the inspection information. The vehicle inspection report may then be updated to indicate the potential vehicle defects identified by the language model.

9 Claims, 7 Drawing Sheets

(56) References Cited

U.S. PATENT DOCUMENTS 6,801,920 B1 10/2004 Wischinski
7,117,075 B1 10/2006 Larschan et al.
7,139,780 B2 11/2006 Lee et al.
7,209,959 B1 4/2007 Campbell et al.
7,233,684 B2 6/2007 Fedorovskaya et al.
7,386,376 B2 6/2008 Basir et al.
7,389,178 B2 6/2008 Raz et al.
7,398,298 B2 7/2008 Koch
7,492,938 B2 2/2009 Brinson, Jr. et al.
7,526,103 B2 4/2009 Schofield et al.
7,555,378 B2 6/2009 Larschan et al.
7,596,417 B2 9/2009 Fister et al.
7,606,779 B2 10/2009 Brinson, Jr. et al.
7,715,961 B1 5/2010 Kargupta
7,769,499 B2 8/2010 McQuade et al.
7,844,088 B2 11/2010 Brinson, Jr. et al.
7,859,392 B2 12/2010 McClellan et al.
7,877,198 B2 1/2011 Tenzer et al.
7,881,838 B2 2/2011 Larschan et al.
7,957,936 B2 6/2011 Eryurek et al.
8,019,581 B2 9/2011 Sheha et al.
8,024,311 B2 9/2011 Wood et al.
8,032,277 B2 10/2011 Larschan et al.
8,140,358 B1 3/2012 Ling et al.
8,156,108 B2 4/2012 Middleton et al.
8,156,499 B2 4/2012 Foulger et al.
8,169,343 B2 5/2012 Sheha et al.
8,175,992 B2 5/2012 Bass, II et al.
8,230,272 B2 7/2012 Middleton et al.
8,260,489 B2 9/2012 Nielsen et al.
8,417,402 B2 4/2013 Basir
8,442,508 B2 5/2013 Harter et al.
8,457,395 B2 6/2013 Boncyk et al.
8,509,412 B2 8/2013 Sheha et al.
8,543,625 B2 9/2013 Middleton et al.
8,560,164 B2 10/2013 Nielsen et al.
8,615,555 B2 12/2013 Koch
8,625,885 B2 1/2014 Brinson, Jr. et al.
8,626,568 B2 1/2014 Warkentin et al.
8,633,672 B2 1/2014 Jung et al.
8,669,857 B2 3/2014 Sun et al.
8,682,572 B2 3/2014 Raz et al.
8,706,409 B2 4/2014 Mason et al.
8,831,825 B2 9/2014 Shah et al.
8,836,784 B2 9/2014 Erhardt et al.
8,918,229 B2 12/2014 Hunt et al.
8,953,228 B1 2/2015 Mehers
8,989,914 B1 3/2015 Nemat-Nasser et al.
8,989,959 B2 3/2015 Plante et al.
8,996,240 B2 3/2015 Plante
9,024,744 B2 5/2015 Klose et al.
9,053,590 B1 6/2015 Kator et al.
9,137,498 B1 9/2015 L'Heureux et al.
9,147,335 B2 9/2015 Raghunathan et al.
9,152,609 B2 10/2015 Schwartz et al.
9,165,196 B2 10/2015 Kesavan et al.
9,170,913 B2 10/2015 Hunt et al.
9,189,895 B2 11/2015 Phelan et al.
9,230,250 B1 1/2016 Parker et al.
9,230,437 B2 1/2016 Brinton et al.
9,280,435 B2 3/2016 Hunt et al.
9,311,271 B2 4/2016 Wright
9,344,683 B1 5/2016 Nemat-Nasser et al.
9,349,228 B2 5/2016 Ochsendorf et al.
9,384,111 B2 7/2016 Hunt et al.
9,389,147 B1 7/2016 Lambert et al.
9,402,060 B2 7/2016 Plante
9,412,282 B2 8/2016 Hunt et al.
9,439,280 B2 9/2016 Chang et al.
9,445,270 B1 9/2016 Bicket et al.
9,477,639 B2 10/2016 Fischer et al.
9,477,989 B2 10/2016 Grimm et al.
9,527,515 B2 12/2016 Hunt et al.
9,594,725 B1 3/2017 Cook et al.
9,672,667 B2 6/2017 Mason et al.
9,688,282 B2 6/2017 Cook et al.
9,728,015 B2 8/2017 Kwak
9,761,063 B2 9/2017 Lambert et al.
9,761,067 B2 9/2017 Plante et al.
9,811,536 B2 11/2017 Morris et al.
9,818,088 B2 11/2017 Penilla et al.
9,846,979 B1 12/2017 Sainaney et al.
9,849,834 B2 12/2017 Reed et al.
9,852,625 B2 12/2017 Victor et al.
9,892,376 B2 2/2018 Pfeiffer et al.
9,922,567 B2 3/2018 Molin et al.
9,934,628 B2 4/2018 Kreiner et al.
9,996,980 B1 6/2018 Gonzalez et al.
10,015,452 B1 7/2018 Schofield et al.
10,033,706 B2 7/2018 Bicket et al.
10,040,459 B1 8/2018 Kukreja
10,055,906 B1 * 8/2018 Fournier ................ F01N 11/00
10,065,652 B2 9/2018 Shenoy et al.
10,068,392 B2 9/2018 Cook et al.
10,075,669 B2 9/2018 Vanman et al.
10,083,547 B1 9/2018 Tomatsu
10,085,149 B2 9/2018 Bicket et al.
10,094,308 B2 10/2018 Kolhouse et al.
10,102,495 B1 10/2018 Zhang et al.
10,127,810 B2 11/2018 Durie, Jr. et al.
10,157,321 B2 12/2018 Becker et al.
10,173,486 B1 1/2019 Lee et al.
10,173,544 B2 1/2019 Hendrix et al.
10,196,071 B1 2/2019 Rowson et al.
10,206,107 B2 2/2019 Bicket et al.
10,223,935 B2 3/2019 Sweany et al.
10,275,959 B2 4/2019 Ricci
10,286,875 B2 5/2019 Penilla et al.
10,290,036 B1 5/2019 Gella et al.
10,311,749 B1 6/2019 Kypri et al.
10,336,190 B2 7/2019 Yokochi et al.
10,388,075 B2 8/2019 Schmirler et al.
10,389,739 B2 8/2019 Solotorevsky
10,390,227 B2 8/2019 Bicket et al.
10,444,949 B2 10/2019 Scott et al.
10,445,559 B2 10/2019 Joseph et al.
10,459,444 B1 10/2019 Kentley-Klay
10,460,183 B2 10/2019 Welland et al.
10,460,600 B2 10/2019 Julian et al.
10,471,955 B2 11/2019 Kouri et al.
10,486,709 B1 11/2019 Mezaael
10,489,222 B2 11/2019 Sathyanarayana et al.
10,497,108 B1 * 12/2019 Knuffman .............. G06Q 10/20
10,523,904 B2 12/2019 Mahmoud et al.
10,573,183 B1 2/2020 Li et al.
10,579,123 B2 3/2020 Tuan et al.
10,609,114 B1 3/2020 Bicket et al.
10,621,873 B1 4/2020 Spiel et al.
10,623,899 B2 4/2020 Watkins et al.
10,632,941 B2 4/2020 Chauncey et al.
10,652,335 B2 5/2020 Botticelli
10,715,976 B2 7/2020 Hoffner et al.
10,762,363 B2 9/2020 Watanabe
10,782,691 B2 9/2020 Suresh et al.
10,788,990 B2 9/2020 Kim et al.
10,789,840 B2 9/2020 Boykin et al.
10,803,496 B1 10/2020 Hopkins
10,818,109 B2 10/2020 Palmer et al.
10,827,324 B1 11/2020 Hajimiri et al.
10,843,659 B1 11/2020 Innocenzi et al.
10,848,670 B2 11/2020 Gatti et al.
10,878,030 B1 12/2020 Lambert et al.
10,969,852 B2 4/2021 Tuan et al.
10,979,871 B2 4/2021 Hajimiri et al.
10,999,269 B2 5/2021 Bicket et al.
10,999,374 B2 5/2021 ElHattab et al.
11,046,205 B1 6/2021 Govan et al.
11,069,257 B2 7/2021 Palmer et al.
11,080,568 B2 8/2021 ElHattab et al.
11,122,488 B1 9/2021 Lloyd et al.
11,126,910 B1 9/2021 Akhtar et al.
11,127,130 B1 9/2021 Jain et al.
11,131,986 B1 9/2021 Gal et al.
11,132,853 B1 9/2021 Akhtar et al.

(56) References Cited

U.S. PATENT DOCUMENTS 11,137,744 B1 10/2021 Heddleston et al.
11,142,175 B2 10/2021 Chow et al.
11,158,177 B1 10/2021 ElHattab et al.
11,170,590 B1 * 11/2021 Laranang ............... G07B 15/02
11,184,422 B1 11/2021 Bicket et al.
11,188,046 B1 11/2021 ElHattab et al.
11,190,373 B1 11/2021 Stevenson et al.
11,204,637 B2 12/2021 Tuan et al.
11,260,878 B2 3/2022 Palmer et al.
11,341,786 B1 5/2022 Calmer et al.
11,349,901 B1 5/2022 Duffield et al.
11,352,013 B1 6/2022 Srinivasan et al.
11,352,014 B1 6/2022 Srinivasan et al.
11,356,605 B1 6/2022 Shemet et al.
11,356,909 B1 6/2022 Lloyd
11,365,980 B1 6/2022 Akhtar et al.
11,386,325 B1 7/2022 Srinivasan et al.
11,436,844 B2 9/2022 Carruthers et al.
11,451,610 B1 9/2022 Saunders et al.
11,451,611 B1 9/2022 Saunders et al.
11,460,507 B2 10/2022 Lloyd et al.
11,464,079 B1 10/2022 Aschenbener et al.
11,479,142 B1 10/2022 Govan et al.
11,494,921 B2 11/2022 ElHattab et al.
11,522,857 B1 12/2022 Symons et al.
11,532,169 B1 12/2022 Hassan et al.
11,558,449 B1 1/2023 Bicket et al.
11,595,632 B2 2/2023 Tsai et al.
11,599,097 B1 3/2023 Gal et al.
11,606,736 B1 3/2023 Lloyd et al.
11,611,621 B2 3/2023 ElHattab et al.
11,615,141 B1 3/2023 Hoye et al.
11,620,909 B2 4/2023 Tsai et al.
11,627,252 B2 4/2023 Delegard et al.
11,641,388 B1 5/2023 Saunders et al.
11,641,604 B1 5/2023 Lloyd
11,643,102 B1 5/2023 Calmer et al.
11,659,060 B2 5/2023 Davis et al.
11,665,223 B1 5/2023 Duffield et al.
11,669,714 B1 6/2023 Akhtar et al.
11,671,478 B1 6/2023 Saunders et al.
11,674,813 B1 6/2023 Chung et al.
11,675,042 B1 6/2023 Lloyd et al.
11,683,579 B1 6/2023 Symons et al.
11,688,211 B1 6/2023 Calmer et al.
11,694,317 B1 7/2023 Jain et al.
11,704,984 B1 7/2023 ElHattab et al.
11,709,500 B2 7/2023 Lloyd et al.
11,710,409 B2 7/2023 Nanda et al.
11,720,087 B1 8/2023 Heddleston et al.
11,727,054 B2 8/2023 Grandhi et al.
11,731,469 B1 8/2023 McGillan
11,736,312 B1 8/2023 Xiao et al.
11,741,760 B1 8/2023 Dubin et al.
11,748,377 B1 9/2023 Zhang et al.
11,752,895 B1 9/2023 Govan et al.
11,756,346 B1 9/2023 Wu et al.
11,756,351 B1 9/2023 Akhtar et al.
11,758,096 B2 9/2023 Shah et al.
11,776,328 B2 10/2023 Yang et al.
11,780,446 B1 10/2023 Srinivasan et al.
11,782,930 B2 10/2023 McGee et al.
11,787,413 B2 10/2023 Tsai et al.
11,798,187 B2 10/2023 Zaheer et al.
11,798,298 B2 10/2023 Hassan et al.
11,800,317 B1 10/2023 Dugar et al.
11,838,884 B1 12/2023 Dergosits et al.
11,842,577 B1 12/2023 Harrison et al.
11,847,911 B2 12/2023 ElHattab et al.
11,855,801 B1 12/2023 Stevenson et al.
11,861,955 B1 1/2024 Dubin et al.
11,863,712 B1 1/2024 Young et al.
11,866,055 B1 1/2024 Srinivasan et al.
11,868,919 B1 1/2024 Zhang et al.
11,875,580 B2 1/2024 Hassan et al.
11,875,683 B1 1/2024 Tsai et al.
11,890,962 B1 2/2024 Govan et al.
11,937,152 B2 3/2024 Hajimiri et al.
11,938,948 B1 3/2024 Davis et al.
11,959,772 B2 4/2024 Robbins et al.
11,974,410 B1 4/2024 Lin et al.
11,975,685 B1 5/2024 Innocenzi et al.
11,989,001 B1 5/2024 ElHattab et al.
11,995,546 B1 5/2024 Srinivasan et al.
11,997,181 B1 5/2024 Davis et al.
12,000,940 B1 6/2024 Lloyd et al.
12,106,613 B2 10/2024 Calmer et al.
12,117,546 B1 10/2024 Lloyd et al.
12,126,917 B1 10/2024 Shemet et al.
12,128,919 B2 10/2024 Calmer et al.
12,140,445 B1 11/2024 Akhtar et al.
12,150,186 B1 11/2024 Aguilar et al.
2002/0061758 A1 5/2002 Zarlengo et al.
2002/0128751 A1 9/2002 Engstrom et al.
2002/0169850 A1 11/2002 Batke et al.
2003/0081935 A1 5/2003 Kirmuss
2003/0154009 A1 8/2003 Basir et al.
2004/0093264 A1 5/2004 Shimizu
2004/0236476 A1 11/2004 Chowdhary
2004/0236596 A1 11/2004 Chowdhary et al.
2005/0131585 A1 6/2005 Luskin et al.
2005/0131646 A1 6/2005 Camus
2005/0286774 A1 12/2005 Porikli
2006/0167591 A1 7/2006 McNally
2007/0050108 A1 3/2007 Larschan et al.
2007/0173991 A1 7/2007 Tenzer et al.
2008/0252487 A1 10/2008 McClellan et al.
2008/0319602 A1 12/2008 McClellan et al.
2009/0099724 A1 4/2009 Kranz et al.
2009/0141939 A1 6/2009 Chambers et al.
2009/0240427 A1 9/2009 Siereveld et al.
2010/0030586 A1 2/2010 Taylor et al.
2010/0049639 A1 2/2010 Ferro et al.
2010/0281161 A1 11/2010 Cohn et al.
2011/0060496 A1 3/2011 Nielsen et al.
2011/0093306 A1 4/2011 Nielsen et al.
2011/0234749 A1 9/2011 Alon
2011/0276265 A1 11/2011 Husain
2012/0109418 A1 5/2012 Lorber
2012/0194357 A1 8/2012 Ciolli
2012/0201277 A1 8/2012 Tanner et al.
2012/0218416 A1 8/2012 Leny et al.
2012/0235625 A1 9/2012 Takehara
2012/0262104 A1 10/2012 Kirsch
2012/0303397 A1 11/2012 Prosser
2013/0073112 A1 3/2013 Phelan et al.
2013/0162421 A1 6/2013 Inaguma et al.
2013/0162425 A1 6/2013 Raghunathan et al.
2013/0164713 A1 6/2013 Hunt et al.
2013/0211559 A1 8/2013 Lawson et al.
2013/0244210 A1 9/2013 Nath et al.
2013/0250040 A1 9/2013 Vitsnudel et al.
2013/0332004 A1 12/2013 Gompert et al.
2014/0012492 A1 1/2014 Bowers et al.
2014/0095061 A1 4/2014 Hyde
2014/0098060 A1 4/2014 McQuade et al.
2014/0113619 A1 4/2014 Tibbitts et al.
2014/0159660 A1 6/2014 Klose et al.
2014/0195106 A1 7/2014 McQuade et al.
2014/0223090 A1 8/2014 Malone
2014/0278108 A1 9/2014 Kerrigan et al.
2014/0293069 A1 10/2014 Lazar et al.
2014/0328517 A1 11/2014 Gluncic
2014/0337429 A1 11/2014 Asenjo et al.
2014/0354227 A1 12/2014 Tyagi et al.
2014/0354228 A1 12/2014 Williams et al.
2015/0025734 A1 1/2015 Cook et al.
2015/0044641 A1 2/2015 Chauncey et al.
2015/0074091 A1 3/2015 Walkin et al.
2015/0116114 A1 4/2015 Boyles
2015/0226563 A1 8/2015 Cox et al.
2015/0283912 A1 10/2015 Shimizu et al.
2015/0347121 A1 12/2015 Harumoto
2016/0046298 A1 2/2016 DeRuyck et al.

(56) References Cited

U.S. PATENT DOCUMENTS

2016/0110066 A1 4/2016 McCormick et al.
2016/0176401 A1 6/2016 Pilkington
2016/0275376 A1 9/2016 Kant
2016/0288744 A1 10/2016 Rutherford et al.
2016/0293049 A1 10/2016 Monahan et al.
2016/0343091 A1 11/2016 Han et al.
2016/0375780 A1 12/2016 Penilla et al.
2017/0039784 A1 2/2017 Gelbart et al.
2017/0060726 A1 3/2017 Glistvain
2017/0102463 A1 4/2017 Hwang
2017/0123397 A1 5/2017 Billi et al.
2017/0124476 A1 5/2017 Levinson et al.
2017/0140603 A1 5/2017 Ricci
2017/0195265 A1 7/2017 Billi et al.
2017/0200061 A1 7/2017 Julian et al.
2017/0263049 A1 9/2017 MacDonald et al.
2017/0263120 A1 9/2017 Durie, Jr. et al.
2017/0278004 A1 9/2017 McElhinney et al.
2017/0286838 A1 10/2017 Cipriani et al.
2017/0291611 A1 10/2017 Innes et al.
2017/0291800 A1 10/2017 Scoville et al.
2017/0323641 A1 11/2017 Shimizu et al.
2017/0332199 A1 11/2017 Elliott et al.
2017/0345283 A1 11/2017 Kwon et al.
2017/0366935 A1 12/2017 Ahmadzadeh et al.
2018/0001771 A1 1/2018 Park et al.
2018/0001899 A1 1/2018 Shenoy et al.
2018/0012196 A1 1/2018 Ricci et al.
2018/0025636 A1 1/2018 Boykin et al.
2018/0063576 A1 3/2018 Tillman et al.
2018/0068206 A1 3/2018 Pollach et al.
2018/0072313 A1 3/2018 Stenneth
2018/0075309 A1 3/2018 Sathyanarayana et al.
2018/0093672 A1 4/2018 Terwilliger et al.
2018/0174485 A1 6/2018 Stankoulov
2018/0182126 A1* 6/2018 Xu .......................... G06N 3/047
2018/0234514 A1 8/2018 Rajiv et al.
2018/0247109 A1 8/2018 Joseph et al.
2018/0253109 A1 9/2018 Fontaine et al.
2018/0262724 A1 9/2018 Ross
2018/0295141 A1 10/2018 Solotorevsky
2018/0329381 A1 11/2018 Doh et al.
2018/0356800 A1 12/2018 Chao et al.
2018/0357484 A1 12/2018 Omata
2018/0364686 A1 12/2018 Naidoo et al.
2019/0003848 A1 1/2019 Hoten et al.
2019/0007690 A1 1/2019 Varadarajan et al.
2019/0054876 A1 2/2019 Ferguson et al.
2019/0065951 A1 2/2019 Luo et al.
2019/0077308 A1 3/2019 Kashchenko
2019/0118655 A1 4/2019 Grimes et al.
2019/0120947 A1 4/2019 Wheeler et al.
2019/0174158 A1 6/2019 Herrick et al.
2019/0188847 A1 6/2019 Gonzalez et al.
2019/0244301 A1 8/2019 Seth et al.
2019/0257661 A1 8/2019 Stentz et al.
2019/0265712 A1 8/2019 Satzoda et al.
2019/0272725 A1 9/2019 Viklund et al.
2019/0286948 A1 9/2019 Sathyanarayana et al.
2019/0303718 A1 10/2019 Tanigawa et al.
2019/0304082 A1 10/2019 Tokashiki et al.
2019/0318419 A1 10/2019 VanderZanden
2019/0318549 A1 10/2019 Zeira et al.
2019/0327590 A1 10/2019 Kubo et al.
2019/0370581 A1 12/2019 Cordell et al.
2020/0018612 A1 1/2020 Wolcott
2020/0026282 A1 1/2020 Choe et al.
2020/0050182 A1 2/2020 Cheng et al.
2020/0074326 A1 3/2020 Balakrishnan et al.
2020/0074397 A1 3/2020 Burda et al.
2020/0139847 A1 5/2020 Baumer et al.
2020/0151974 A1* 5/2020 Ghosh .................. G07C 5/0866
2020/0162489 A1 5/2020 Bar-Nahum et al.
2020/0164509 A1 5/2020 Shults et al.
2020/0168094 A1 5/2020 Shimodaira et al.
2020/0283003 A1 9/2020 Raichelgauz
2020/0311602 A1 10/2020 Hawley et al.
2020/0312155 A1 10/2020 Kelkar et al.
2020/0327009 A1 10/2020 Callison et al.
2020/0327369 A1 10/2020 Cruz et al.
2020/0342230 A1 10/2020 Tsai et al.
2020/0342506 A1 10/2020 Levy et al.
2020/0371773 A1 11/2020 Kato et al.
2020/0380806 A1 12/2020 Tabata
2020/0389415 A1 12/2020 Zhao et al.
2020/0401803 A1* 12/2020 Gilbert .................... G06T 11/60
2021/0097315 A1 4/2021 Carruthers et al.
2021/0397908 A1 12/2021 ElHattab et al.
2022/0165073 A1 5/2022 Shikii et al.
2022/0222984 A1* 7/2022 Singh ................. G06Q 30/0206
2022/0289203 A1 9/2022 Makilya et al.
2022/0374737 A1 11/2022 Dhara et al.
2023/0077207 A1 3/2023 Hassan et al.
2023/0153735 A1 5/2023 Dhara et al.
2023/0169420 A1 6/2023 Dhara et al.
2023/0219592 A1 7/2023 Calmer et al.
2023/0281553 A1 9/2023 Singh et al.
2023/0298410 A1 9/2023 Calmer et al.
2024/0003749 A1 1/2024 Lin et al.
2024/0005678 A1 1/2024 Hassan et al.
2024/0013423 A1 1/2024 Zaheer et al.
2024/0063596 A1 2/2024 Pandian et al.
2024/0146629 A1 5/2024 Lloyd
2024/0304046 A1* 9/2024 Carranza .............. G06K 7/1413
2024/0394389 A1 11/2024 Wen et al.

FOREIGN PATENT DOCUMENTS

EP 1615178 A2 1/2006
GB 2288892 A 11/1995
WO WO 2017/123665 A1 7/2017
WO WO 2018/131322 A1 7/2018
WO WO 2019/099409 A1 5/2019
WO WO 2019/125545 A1 6/2019
WO WO 2019/133533 A1 7/2019
WO WO 2023/244513 A1 12/2023

OTHER PUBLICATIONS

"Cargo Monitor", Samsara Inc., accessed Feb. 21, 2024 [publication date unknown], in 2 pages. URL: https://www.samsara.com/products/models/cargo-monitor.

"Connect your operations on the Samsara Platform.", Samsara Inc., [publication date unknown]. URL: https://www.samsara.com/products/platform/?gad_source=1&gclid=EAIaIQobChMI14DWIofYgwMVaymtBh36cwx9EAAYASAAEgKjUfD_BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

Driver I, The Power of Vision, Netradyne, [publication date unknown], in 2 pages.

"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.

"Driver Speed Management for Fleets—Monitoring Speeding in your fleet to increase safety and lower costs", Lytx, 2018, in 9 pages. URL: https://web.archive.org/web/20181217230050/https:/www.lytx.com/en-US/fleet-services/program-enhancements/speed-management-for-fleets.

"Dual-Facing AI Dash Cam—CM32", Samsara Inc., accessed Feb. 7, 2024 [publication date unknown]. URL: https://www.samsara.com/ca/products/models/cm32/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"eco:Drive™ Social, the community of responsible drivers", Stellantis, Apr. 15, 2014, in 2 pages. URL: https://www.media.stellantis.com/em-en/fiat/press/eco-drive-social-the-community-of-responsible-drivers.

(56) References Cited

OTHER PUBLICATIONS

"EcoDrive", Wikipedia, 2022, in 1 page. URL: https://en.wikipedia.org/wiki/EcoDrive.
"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.
"EM21—Environmental Monitor", Samsara Inc., accessed Feb. 21, 2024 [publication date unknown], in 5 pages. URL: https://www.samsara.com/uk/products/models/em21/.
"Fast Facts: Electronic Logging Device (ELD) Rule", Federal Motor Carrier Safety Administration, U.S. Department of Transportation, Jun. 2017, Document No. FMCSA-ADO-17-003 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
"Fiat 500—2015 Owner's Manual", FCA US LLC, 2016, 5th ed., in 440 pages.
"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Fiat-500-Eco-system=.
"Fiat launches EcoDrive for 500 and Grande Punto", Indian Autos Blog, Jul. 10, 2008, in 4 pages. URL: https://indianautosblog.com/fiat-launches-ecodrive-for-500-and-grande-punto-p3049.
"Fiat launches fleet-specific eco:Drive system", Fleet World, 2010, in 3 pages. URL: https://fleetworld.co.uk/fiat-launches-fleet-specific-ecodrive-system/.
Goodwin, A., "Fiats ecoDrive teaches efficient driving", CNET, Oct. 22, 2008, in 5 pages. URL: https://www.cnet.com/roadshow/news/fiats-ecodrive-teaches-efficient-driving/.
"Front-Facing AI Dash Cam—CM31", Samsara Inc., accessed Feb. 7, 2024 [publication date unknown]. URL: https://www.samsara.com/products/models/cm31/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Guide: DRIVE risk score 101", Motive Technologies, Inc., [publication date unknown], Document No. 2022Q2_849898994 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 22 pages.
"Introduction Pack", Drivecam, Inc., 2012, in 32 pages. URL: https://www.iae-services.com.au/downloads/DriveCam-Introduction-Pack.pdf.
"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.
"KeepTruckin Launches New AI Dashcam Featuring Industry-Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
"Lytx DriveCam Program Adds New Client-Centric Enhancements", Mass Transit, Oct. 4, 2016, in 6 pages. URL: https://www.masstransitmag.com/safety-security/press-release/12265105/lytx-lytx-drivecamtm-program-adds-newclient-centric-enhancements-evolving-the-gold-standard-video-telematics-program.
"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.
"Making roads safer for everyone, everywhere", Light Metrics, 2023, in 8 pages. URL: https://www.lightmetrics.co/about-us.
"Map and Tile Coordinates", Google for Developers, last updated Oct. 23, 2023 [retrieved on Oct. 24, 2023], in 5 pages. URL: https://developers.google.com/maps/documentation/javascript/coordinates.
"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.
"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.
"Nauto—Getting Started", Manualslib, Nauto, Inc., Apr. 20, 2017, in 18 pages. URL: https://www.manualslib.com/manual/1547723/Nauto-Nauto.html.
"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.
"NetraDyne Discuss their AI Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.
"Netradyne Vision based driver safety solution—Model Name: Driver I, Model No. DRI-128-TMO" [device specification], [publication date unknown], in 4 pages. URL: https://device.report/m/4dd89450078fa688b333692844d3bde954ddfbaf5c105c9d1d42dfd6965cbf1b.pdf.
"NetraDyne, an Artificial Intelligence Leader, Launches Driver-i™, a Vision-Based Platform, Focusing on Commercial Vehicle Driver Safety", Netradyne, [publication date unknown], in 2 pages.
"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daabc63d4a307cfd3dcb.pdf.
"Product Brief: System Overview", Motive Technologies, Inc., [publication date unknown], Document No. 2022Q4_1203118185166511 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
"Product Brief: System Overview", Motive Technologies, Inc., [publication date unknown], Document No. 2022Q4_1203118185166511 (referenced in Jan. 24, 2024 Complaint, Case No. 1:24-cv-00084-UNA), in 3 pages. URL: https://gomotive.com/content-library/guides/system-overview/.
"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.
"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?t%5B0%5D=Samsara&t%5B1%5D=Telematics&t%5B2%5D=Connectivity&curl=1.

(56) References Cited

OTHER PUBLICATIONS

"Sensor Fusion: Building the Bigger Picture of Risk", Lytx, Apr. 12, 2019, in 1 page. URL: https://www.lytx.com/newsletter/sensor-fusion-building-the-bigger-picture-of-risk.
"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https://keeptruckin.com/dashcam.
"Spec Sheet: AI Dashcam", Motive Technologies, Inc., [publication date unknown], Document No. 2023Q2_1204527643716537 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Spec Sheet: AI Dashcam", Motive Technologies, Inc., [publication date unknown], Document No. 2023Q2_1205736073289732 (referenced in Jan. 24, 2024 Complaint, Case No. 1:24-cv-00084-UNA), in 5 pages. URL: https://gomotive.com/content-library/spec-sheet/ai-dashcam/.
"Spec Sheet: AI Omnicam", Motive Technologies, Inc., [publication date unknown], Document No. 2023Q2_1204519709838862 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Spec Sheet: Smart Dashcam", Motive Technologies, Inc., [publication date unknown], Document No. 2022Q2_911703417 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
"Spec Sheet: Vehicle Gateway", Motive Technologies, Inc., [publication date unknown], Document No. 2022Q1_858791278 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.
"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.
"The 2012 Fiat 500: eco:Drive", Fiat500USA.com, Feb. 14, 2011, in 24 pages. URL: http://www.fiat500usa.com/2011/02/2012-fiat-500-ecodrive.html.
"The World's Smartest 360° Dashcam: Vezo 360—Fast Facts", Arvizon, [publication date unknown], in 7 pages. URL: https://cdn.newswire.com/files/x/5e/13/b92cd7c6259a708e1dfdaa0123c4.pdf.
"What is a ter-a-flop?", netradyne.com, [publication date unknown], in 2 pages.
"Vehicle Gateway", Samsara Inc., [publication date unknown]. URL: https://www.samsara.com/products/models/vehicle-gateway (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Vezo 360 Dash Cam—Capture Every Single Angle in Crisp Detail", ArVizon, 2019, in 13 pages. URL: https://www.arvizon.com/vezo-360-dash-cam/.
"Vezo 360, the World's Smartest Dashcam, Keeps You Awake at the Wheel", PR Newswire, Apr. 2, 2019, in 4 pages. URL: https://www.prnewswire.com/news-releases/vezo-360-the-worlds-smartest-dashcam-keeps-you-awake-at-the-wheel-300823457.html.
"The Home of Actionable Transportation Insights—Meet Altitude", Geotab ITS, accessed on Apr. 1, 2024 [publication date unknown], in 5 pages. URL: https://its.geotab.com/altitude/.
"Transform your business with the Connected Operations ™ Cloud", Samsara Inc., accessed Feb. 21, 2024 [publication date unknown], in 8 pages. URL: https://www.samsara.com/products/platform/#impact0.
24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_trucking_industry/CSA (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 1 page.
Alpert, B., "Deep Learning for Distracted Driving Detection", Nauto, Jan. 15, 2019, in 10 pages. URL: https://www.nauto.com/blog/nauto-engineering-deep-learning-for-distracted-driver-monitoring.
Amazon Web Services, "How Nauto Is Using AI & MI to Build a Data Platform That Makes Driving Safer and Fleets Smarter" [video], YouTube, Apr. 16, 2018, screenshot in 1 page. URL: https://www.youtube.com/watch?v=UtMIrYTmCMU.
Armstrong, C. et al. "Transport Canada Commercial Bus HVEDR Feasibility Study (File No. T8080-160062) Deliverable No. 4", Mecanica Scientific Services Corp, 2018, in 62 pages. URL: https://transcanadahvedr.ca/wp-content/uploads/2022/01/T8080_Deliverable4-DevSmryRpt-FINAL-20180804_English.pdf.
Automototv, "Fiat ecoDrive System" [video], YouTube, Oct. 6, 2008, screenshot in 1 page URL: https://www.youtube.com/watch?v=AUSb2dBBI8E.
Batchelor, B. et al., "Vision Systems on the Internet", Proc. SPIE 6000, Two- and Three- Dimensional Methods for Inspection and Metrology III, Nov. 2005, vol. 600003, in 15 pages.
Bendix Commercial Vehicle Systems LLC, "Bendix launches new Wingman Fusion safety system at Mid-America Trucking Show", OEM Off-Highway, Mar. 25, 2015, in 10 pages. URL: https://www.oemoffhighway.com/electronics/sensors/proximity-detection-safety-systems/press-release/12058015/bendix-launches-new-wingman-fusion-safety-system-at-midamerica-trucking-show.
Bendix, "Bendix® Wingman ® Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.
Bendix, "Quick Reference Catalog", Bendix Commercial Vehicle Systems LLC, 2018, in 165 pages. URL: https://www.bendix.com/media/home/bw1114_us_010.pdf (uploaded in 2 parts).
Bergasa, L. M. et al., "DriveSafe: an App for Alerting Inattentive Drivers and Scoring Driving Behaviors", IEEE Intelligent Vehicles Symposium (IV), Jun. 2014, in 7 pages.
Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.
Brown, P. et al., "AI Dash Cam Benchmarking" [report], Strategy Analytics, Inc., Apr. 15, 2022, in 27 pages.
Camden, M. et al., "AI Dash Cam Performance Benchmark Testing Final Report", Virginia Tech Transportation Institute, revised Aug. 17, 2023 [submitted Jun. 30, 2023] (filed with Jan. 24, 2024 Complaint, Case No. 1:24-cv-00084-UNA), in 110 pages.
Camden, M. et al., "AI Dash Cam Performance Benchmark Testing Final Report", Virginia Tech Transportation Institute, submitted Jun. 30, 2023 (filed with Jan. 24, 2024 Complaint, Case No. 1:24-cv-00084-UNA), in 109 pages.
Camillo, J., "Machine Vision for Medical Device Assembly", Assembly, Mar. 3, 2015, in 5 pages. URL: https://www.assemblymag.com/articles/92730-machine-vision-for-medical-device-assembly.
Camillo, J., "Machine Vision for Medical Device Assembly", Assembly, Mar. 3, 2015, in 5 pages.
Cetecom, "FCC/IC Test Setup Photos, Intelligent Driving Monitoring System Smart Connected Dash Cam", Cetecom, Inc., Feb. 7, 2018, in 9 pages. URL: https://device.report/m/a68e1abef29f58b699489f50a4d27b81f1726ab4f55b3ac98b573a286594dc54.pdf.
Chauhan, V. et al., "A Comparative Study of Machine Vision Based Methods for Fault Detection in an Automated Assembly Machine", Procedia Manufacturing, 2015, vol. 1, pp. 416-428.

(56) References Cited

OTHER PUBLICATIONS

Chiou, R. et al., "Manufacturing E-Quality Through Integrated Web-enabled Computer Vision and Robotics", The International Journal of Advanced Manufacturing Technology, Aug. 2009, vol. 43, in 19 pages.
Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.
Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam.pdf.
Cordes, C., "Ask an Expert: Capturing Fleet Impact from Telematics", McKinsey & Co., Jun. 13, 2017, in 3 pages. URL: https://www.mckinsey.com/capabilities/operations/our-insights/ask-an-expert-capturing-fleet-impact-from-telematics.
D'Agostino, C. et al., "Learning-Based Driving Events Recognition and Its Application to Digital Roads", IEEE Transactions on Intelligent Transportation Systems, Aug. 2015, vol. 16(4), pp. 2155-2166.
Dillon, A., "User Interface Design", MacMillan Encyclopedia of Cognitive Science, 2003, vol. 4, London: MacMillan, in 18 pages (pp. 453-458). Downloaded from http://hdl.handle.net/10150/105299.
Dillon, A., "User Interface Design", *MacMillan Encyclopedia of Cognitive Science*, 2006, vol. 4, London: MacMillan, in 6 pages (pp. 453-458). Downloaded from https://onlinelibrary.wiley.com/doi/10.1002/0470018860.s00054.
Dunn, B., "What is the Lytx DriveCam?", Autobytel, Jul. 12, 2014, in 1 page. URL: https://www.autobytel.com/what-is-lytx-drivecam.
Ekström, L., "Estimating fuel consumption using regression and machine learning", KTH Royal Institute of Technology, Degree Project in Mathematics, 2018, in 126 pages.
Engelbrecht, J. et al., "A Survey of Smartphone-based Sensing in Vehicles for ITS Applications", IET Intelligent Transport Systems, Jul. 2015, vol. 9(10), in 23 pages.
Fiat, "Interview to Giorgio Neri: videotutorial eco:Drive" [video], YouTube, Dec. 1, 2010, screenshot in 1 page. URL: https://www.youtube.com/watch?v=XRDeHbUimOs&t=27s.
Fiatfranco, ""Ciao!" —Fiat ecoDrive" [video], YouTube, Sep. 10, 2007, screenshot in 1 page URL: https://www.youtube.com/watch?v=SluE9Zco55c.
Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities.pdf.
Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.
Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.
Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.
Gilman, E. et al., "Personalised assistance for fuel-efficient driving", Transportation Research Part C, Mar. 2015, pp. 681-705.
Ginevra2008, "Fiat EcoDrive" [video], YouTube, Mar. 7, 2008, screenshot in 1 page. URL: https://www.youtube.com/watch?v=D95p9Bljr90.
Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.
Green, A., "Logistics Disruptors: Motive's Shoaib Makani on AI and automation", McKinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.
Groover, M. P., "Chapter 22 Inspection Technologies", in Automation, Production Systems, and Computer-Integrated Manufacturing, 2015, 4th Edition, Pearson, pp. 647-684.
Groover, M. P., *Automation, Production Systems, and Computer-Integrated Manufacturing*, 2016, 4th Edition (Indian Subcontinent Adaptation), Pearson, in 11 pages.
Hampstead, J. P. "Lightmetrics:an exciting video telematics software startup", FrieghtWaves, Aug. 5, 2018, in 4 pages. URL: https://www.freightwaves.com/news/lightmetrics-exciting-video-telematics-startup.
Han, Z. et al., "Design of Intelligent Road Recognition and Warning System for Vehicles Based on Binocular Vision", IEEE Access, Oct. 2018, vol. 6, pp. 62880-62889.
Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.
Haridas, S., "KeepTruckin Asset Gateway Review", Truck Trailer Tracker, Nov. 16, 2020, in 7 pages. URL: https://trucktrailertracker.com/keeptruckin-asset-gateway-review/.
Haworth, N. et al., "The Relationship between Fuel Economy and Safety Outcomes", Monash University, Accident Research Centre, Dec. 2001, Report No. 188, in 67 pages.
Horowitz, E. "Improve Fleet Safety with Samsara", Samsara Inc., Aug. 25, 2017, in 4 pages. URL: https://www.samsara.com/ca/blog/improve-fleet-safety-with-samsara/.
Horsey, J., "Vezo 360 4K 360 dash cam from $149", Geeky Gadgets, Apr. 3, 2019, in 12 pages. URL: https://www.geeky-gadgets.com/vezo-360-4k-360-dash-cam-Mar. 4, 2019/.
Huang, K.-Y. et al., "A Novel Machine Vision System for the Inspection of Micro-Spray Nozzle", Sensors, Jun. 2015, vol. 15(7), pp. 15326-15338.
Huff, A., "Lytx DriveCam", CCJDigital, Apr. 4, 2014, in 12 pages. URL: https://www.ccjdigital.com/business/article/14929274/lytx-drivecam.
Huff, A., "NetraDyne Uses Artificial Intelligence in New Driver Safety Platform", CCJ, Sep. 15, 2016, in 10 pages. URL: https://www.ccjdigital.com/business/article/14933761/netradyne-uses-artificial-intelligence-in-new-driver-safety-platform.
Junior, J. F. et al., "Driver behavior profiling: An investigation with different smartphone sensors and machine learning", PLoS One, Apr. 2017, vol. 12(4): e0174959, in 16 pages.
Khan, M., "Why and How We Measure Driver Performance", Medium, Jan. 14, 2020. URL: https://medium.com/motive-eng/why-and-how-we-measure-driver-performance-768d5316fb2c# :~: text=By%20studying%20data%20gathered%20from,the%20driver%20a%20safety%20score (filed with Feb. 8, 2024 ITC Complaint, In the Matter of CertainManagement, and Video-Based Safety Systems, Devices, and Components337-TA-3722), in 8 pages.
Kinney, J., "Timeline of the ELD Mandate: History & Important Dates", GPS Trackit, May 3, 2017. URL: https://gpstrackit.com/blog/a-timeline-of-the-eld-mandate-history-and-important-dates/ (filed with Feb, 8, 2024 ITC Complaint, In the Matter of Certain Vehicle Telematics, Fleet Management, and Video-Based Safety Systems, Devices, and Components thereof, Investigation No. 337-TA-3722), in 5 pages.
Kwon, Y. J. et al., "Automated Vision Inspection in Network-Based Production Environment", International Journal of Advanced Manufacturing Technology, Feb. 2009, vol. 45, pp. 81-90.
Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.
Lekach, S., "Driver safety is 'all talk' with this AI real-time road coach", Mashable, Aug. 3, 2018, in 11 pages. URL: https://mashable.com/article/netradyne-driveri-ai-driver-safety.
Lotan, T. et al., "In-Vehicle Data Recorder for Evaluation of Driving Behavior and Safety", Transportation Research Record Journal of the Transportation Research Board, Jan. 2006, in 15 pages.

(56) References Cited

OTHER PUBLICATIONS

Lytx, "TeenSafe Driver Program", American Family Insurance®, 2014, in 10 pages. URL: https://online-sd02.drivecam.com/Downloads/TSD_WebsiteGuide.pdf.
Malamas, Elias N. et al. "A survey on industrial vision systems, applications and tools", Image and Vision Computing, Dec. 28, 2002, vol. 21, pp. 171-188.
Meiring, G. et al., "A Review of Intelligent Driving Style Analysis Systems and Related Artificial Intelligence Algorithms", Sensors, Dec. 2015, vol. 15, pp. 30653-30682.
Mitrovic, D. et al., "Reliable Method for Driving Events Recognition", IEEE Transactions on Intelligent Transportation Systems, Jun. 2005, vol. 6(2), pp. 198-205.
Motive Help Center, "*New Fleet Managers Start Here* —Getting Started with Motive for Fleet Managers", Motive Technologies, Inc., accessed on Oct. 24, 2023 [publication date unknown], in 2 pages. URL: https://helpcenter.gomotive.com/hc/en-us/articles/6162442580893--New-Fleet-Managers-Start-Here-Getting-Started-with-Motive-for-Fleet-Managers.
Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.
Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-us/articles/6908982681629.
Motive Help Center, "How to create a Geofence", Motive Technologies, Inc., accessed on Oct. 24, 2023 [publication date unknown], in 5 pages. URL: https://helpcenter.gomotive.com/hc/en-us/articles/6162211436061-How-to-create-a-Geofence.
Motive Help Center, "How to create Alert for Geofence", Motive Technologies, Inc., accessed on Oct. 24, 2023 [publication date unknown], in 10 pages. URL: https://helpcenter.gomotive.com/hc/en-us/articles/6190688664733-How-to-create-Alert-for-Geofence.
Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.
Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.
Motive Help Center, "How to install Environmental Sensors", Motive Technologies, Inc., accessed on Oct. 24, 2023 [publication date unknown], in 4 pages. URL: https://helpcenter.gomotive.com/hc/en-us/articles/6907777171613.
Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-us/articles/6189047187997-How-to-Manage-A-Group-and-Sub-groups.
Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-us/articles/6190039573789-How-to-manage-Fuel-Hub-Vehicle-Details.
Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-us/articles/6162556676381-How-to-set-up-Custom-Safety-Event-Thresholds-for-vehicles.
Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-us/articles/6189068876701-How-to-monitor-fleet-s-Speeding-behavior.
Motive Help Center, "How to recall/request video from the Motive Fleet Dashboard?", Motive Technologies, Inc., accessed on Oct. 25, 2023 [publication date unknown], in 7 pages. URL: https://helpcenter.gomotive.com/hc/en-us/articles/6162075219229-How-to-recall-request-video-from-the-Motive-Dashcam.
Motive Help Center, "How to record Hours of Service (HOS) with Vehicle Gateway", Motive Technologies, Inc., accessed on Oct. 24, 2023 [publication date unknown], in 3 pages. URL: https://helpcenter.gomotive.com/hc/en-us/articles/6162505072157-How-to-record-Hours-of-Service-HOS-with-Vehicle-Gateway.
Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.
Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-us/articles/6175738246557-How-to-Set-Real-Time-Speeding-Alerts-on-the-Fleet-Dashboard.
Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-us/articles/6162556676381-How-to-set-up-Custom-Safety-Event-Thresholds-for-vehicles.
Motive Help Center, "How to track vehicle speed from the Motive Fleet Dashboard", Motive Technologies, Inc., accessed on Oct. 24, 2023 [publication date unknown], in 4 pages. URL: https://helpcenter.gomotive.com/hc/en-us/articles/6189043119261-How-to-track-vehicle-speed-from-the-Motive-Fleet-Dashboard.
Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.
Motive Help Center, "How to view a Safety Event", Motive Technologies, Inc., accessed on Oct. 25, 2023 [publication date unknown], in 4 pages. URL: https://helpcenter.gomotive.com/hc/en-us/articles/6189410468509-How-to-view-a-Safety-Event.
Motive Help Center, "How to view Fleet DRIVE Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.
Motive Help Center, "How to view Group DRIVE Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score-Report-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view safety events report", Motive Technologies, Inc., accessed on Oct. 24, 2023 [publication date

(56) References Cited

OTHER PUBLICATIONS unknown], in 2 pages. URL: https://helpcenter.gomotive.com/hc/en-us/articles/6190647741853-How-to-view-safety-events-report.

Motive Help Center, "How to view Stop Sign Violation events on Fleet Dashboard", Motive Technologies, Inc., accessed on Feb. 7, 2024 [publication date unknown]. URL: https://helpcenter.gomotive.com/hc/en-us/articles/6163732277917-How-to-view-Stop-Sign-Violation-events-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.

Motive Help Center, "How to view the Driver DRIVE Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view the Safety Hub and DRIVE Score details in the DriverApp", Motive Technologies, Inc., accessed on Oct. 24, 2023 [publication date unknown], in 5 pages. URL: https://helpcenter.gomotive.com/hc/en-us/articles/6162215453853-How-to-view-safety-events-and-Dashcam-videos-on-Motive-App.

Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-Utilization-details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-us/articles/6189574616989-Viewing-Close-Following-Events-on-the-Motive-Fleet-Dashboard.

Motive Help Center, "What are Alert Types?", Motive Technologies, Inc., accessed on Oct. 24, 2023 [publication date unknown], in 3 pages. URL: https://helpcenter.gomotive.com/hc/en-us/articles/8239240188957-What-are-Alert-Types-.

Motive Help Center, "What are Environmental Sensors?", Motive Technologies, Inc., accessed on Oct. 24, 2023 [publication date unknown], in 4 pages. URL: https://helpcenter.gomotive.com/hc/en-us/articles/6907551525661-What-are-Environmental-Sensors-.

Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.

Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.

Motive Help Center, "What are unsafe behaviors?", Motive Technologies, Inc., accessed on Mar. 13, 2023 [publication date unknown], in 4 pages. URL (archived version): https://web.archive.org/web/20230203093145/https://helpcenter.gomotive.com/hc/en-us/articles/6858636962333-What-are-unsafe-behaviors-.

Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-us/articles/6160848958109-What-are-Vehicle-Gateway-Malfunctions-and-Data-Diagnostics.

Motive Help Center, "What is DRIVE Risk Score?", Motive Technologies, Inc., accessed on Oct. 24, 2023 [publication date unknown], in 5 pages. URL: https://helpcenter.gomotive.com/hc/en-us/articles/6162164321693-What-is-DRIVE-risk-score-.

Motive Help Center, "What is DRIVE Risk Score?", Motive Technologies, Inc., accessed on Oct. 24, 2023 [publication date unknown]. URL: https://helpcenter.gomotive.com/hc/en-us/articles/6162164321693-What-is-DRIVE-risk-score- (filed with Feb 8, 2024 ITC Complaint, In the Matter of Certain Vehicle Telematics, Fleet Management, and Video-Based Safety Systems, Devices, and Components thereof, Investigation No. 337-TA-3722), in 5 pages.

Motive Help Center, "What is Event Severity?", Motive Technologies, Inc., accessed on Oct. 24, 2023 [publication date unknown], in 3 pages. URL: https://helpcenter.gomotive.com/hc/en-us/articles/6176003080861-What-is-Event-Severity-.

Motive Help Center, "What is Fuel Hub?", Motive Technologies, Inc., accessed on Feb. 5, 2024 [publication date unknown]. URL: https://helpcenter.gomotive.com/hc/en-us/articles/6161577899165-What-is-Fuel-Hub (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive Help Center, "What is Fuel Hub?", Motive Technologies, Inc., accessed on Oct. 24, 2023 [publication date unknown], in 9 pages. URL: https://helpcenter.gomotive.com/hc/en-us/articles/6161577899165-What-is-Fuel-Hub-.

Motive Help Center, "What is Motive Fleet App?", Motive Technologies, Inc., accessed on Oct. 24, 2023 [publication date unknown], in 12 pages. URL: https://helpcenter.gomotive.com/hc/en-us/articles/6113996661917-What-is-Motive-Fleet-App-.

Motive Help Center, "What is Safety Hub?", Motive Technologies, Inc., accessed on Oct. 24, 2023 [publication date unknown], in 10 pages. URL: https://helpcenter.gomotive.com/hc/en-us/articles/6162472353053-What-is-Safety-Hub-.

Motive Help Center, "What Motive fuel features are available?", Motive Technologies, Inc., accessed on Oct. 24, 2023 [publication date unknown], in 2 pages. URL: https://helpcenter.gomotive.com/hc/en-us/articles/6189158796445-What-Motive-fuel-features-are-available-.

Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-us/articles/6858636962333-What-unsafe-behaviors-does-Motive-monitor-through-Dashcam-and-Vehicle-Gateway- #01HCB72T2EXXW3FFVJ1XSDEG77.

Motive Help Center, "What unsafe behaviors does Motive monitor through Dashcam and Vehicle Gateway?", Motive Technologies, Inc., accessed on Oct. 25, 2023 [publication date unknown], in 4 pages. URL: https://helpcenter.gomotive.com/hc/en-us/articles/6858636962333-What-are-unsafe-behaviors-.

Motive, "AI dash cam comparison: Motive, Samsara, Lytx", Motive Technologies, Inc., [publication date unknown]. URL: https://gomotive.com/products/dashcam/fleet-dash-cam-comparison/#seat-belt-use (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.

Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/fleet-dash-cam-comparison/.

Motive, "Asset Gateway Installation Guide | Cable/Vehicle Powered" [video], YouTube, Jun. 25, 2020, screenshot in 1 page. URL: https://www.youtube.com/watch?v=pME-VMauQgY.

(56) References Cited

OTHER PUBLICATIONS

Motive, "Asset Gateway Installation Guide | Solar Powered" [video], YouTube, Jun. 25, 2020, screenshot in 1 page. URL: https://www.youtube.com/watch?v=jifKM3GT6Bs.
Motive, "Benchmarking AI Accuracy for Driver Safety" [video], YouTube, Apr. 21, 2022, screenshot in 1 page. URL: https://www.youtube.com/watch?v=brRt2h0J80E.
Motive, "CEO Shoaib Makani's email to Motive employees.", Motive Technologies, Inc., Dec. 7, 2022, in 5 pages. URL: https://gomotive.com/blog/shoaib-makanis-message-to-employees/.
Motive, "Coach your drivers using the Motive Safety Hub." [video], YouTube, Mar. 27, 2023, screenshot in 1 page. URL: https://www.youtube.com/watch?v=VeErPXF30js.
Motive, "Equipment and trailer monitoring", Motive Technologies, Inc., accessed on Feb. 18, 2024 [publication date unknown], in 11 pages. URL: https://gomotive.com/products/tracking-telematics/trailer-tracking/.
Motive, "Experts agree, Motive is the most accurate, fastest AI dash cam.", Motive Technologies, Inc., accessed Feb. 21, 2024 [publication date unknown] in 16 pages. URL: https://gomotive.com/products/dashcam/best-dash-cam/.
Motive, "Guide: AI Model Development", Motive Technologies, Inc., accessed on Mar. 29, 2024 [publication date unknown], Document No. 2022Q1_849898994, in 14 pages.
Motive, "Guide: DRIVE risk score", Motive Technologies, Inc., accessed on Apr. 8, 2023 [publication date unknown], Document No. 2022Q2_849898994, in 22 pages.
Motive, "Guide: Smart Event Thresholds", Motive Technologies, Inc., accessed on Apr. 8, 2023 [publication date unknown], Document No. 2022Q1_902914404, in 11 pages.
Motive, "How to install a Motive Vehicle Gateway in light-duty vehicles." [video], YouTube, Aug. 5, 2022, screenshot in 1 page. URL: https://www.youtube.com/watch?v=WnclRs_cFw0.
Motive, "How to install your Motive AI Dashcam." [video], YouTube, Aug. 5, 2022, screenshot in 1 page. URL: https://www.youtube.com/watch?v=3JNG2h3KnU4.
Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.
Motive, "Improve road and fleet safety with driver scores.", Motive Technologies, Inc., Feb. 7, 2019, in 5 pages. URL: https://gomotive.com/blog/improve-fleet-safety-driver-scores/.
Motive, "Industry-leading fleet management solutions", Motive Technologies, Inc., accessed on Feb. 18, 2024 [publication date unknown], in 13 pages. URL: https://gomotive.com/products/.
Motive, "Introducing an easier way to manage unidentified trips.", Motive Technologies, Inc., Apr. 30, 2020, in 5 pages. URL: https://gomotive.com/blog/introducing-easier-ude-management/.
Motive, "Introducing Motive Driver Workflow.", Motive Technologies, Inc., Oct. 16, 2017, in 5 pages. URL: https://gomotive.com/blog/motive-driver-workflow/.
Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.
Motive, "Introducing the Motive Smart Dashcam", Motive Technologies,https://gomotive.com/blog/announcing-smart-dashcam (filed withMatter of Certain Vehicle Telematics, Fleet Management, and Video-Basedand Components thereof, Investigation No. 337-TA-3722), in 9 pages.
Motive, "KeepTruckin ELD Training for Drivers" [video], YouTube, Feb. 2, 2018, screenshot in 1 page. URL: https://www.youtube.com/watch?v=LkJLIT2bGS0.
Motive, "KeepTruckin Smart Dashcam" [video], Facebook, Jun. 6, 2018. URL: https://www.facebook.com/keeptrucking/videos/keeptrucking-smart-dashcam/10212841352048331/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive, "Motive Fleet View | Advanced GPS system for live and historical fleet tracking." [video], YouTube, Jan. 23, 2023, screenshot in 1 page. URL: https://www.youtube.com/watch?v=CSDiDZhjVOQ.
Motive, "Motive introduces Reefer Monitoring for cold chain logistics.", Motive Technologies, Inc., |Oct. 4, 2022, in 5 pages. URL: https://gomotive.com/blog/motive-introduces-reefer-monitoring-for-cold-chain-logistics/.
Motive, "Motive Reefer Monitoring for cold chain logistics." [video], YouTube, Oct. 5, 2022, screenshot in 1 page. URL: https://www.youtube.com/watch?v=rDwS5AmQp-M.
Motive, "Motive Smart Load Board—designed to help you find the right loads faster." [video], YouTube, Nov. 28, 2022, screenshot in 1 page. URL: https://www.youtube.com/watch?v=UF2EQBzLYYk.
Motive, "Motive vs. Samsara: What's the difference?", Motive Technologies, Inc., accessed Feb. 21, 2024 [publication date unknown], in 16 pages. URL: https://gomotive.com/motive-v-samsara/#compare-chart.
Motive, "No. time for downtime—automate fleet maintenance schedules" [video], YouTube, Dec. 20, 2022, screenshot in 1 page. URL: https://www.youtube.com/watch?v=flUccP-ifaU.
Motive, "Product Brief: Driver Safety", Motive Technologies, Inc., accessed on Oct. 24, 2023 [publication date unknown], Document No. 2023Q2_1204527735206670, in 4 pages.
Motive, "Product Brief: System Overview", Motive Technologies, Inc., accessed on Oct. 24, 2023 [publication date unknown], Document No. 2022Q4_1203331000367178, in 4 pages.
Motive, "Product Brief: Tracking & Telematics", Motive Technologies, Inc., accessed on Oct. 24, 2023 [publication date unknown], Document No. 2022Q3_ 1202933457877590, in 4 pages.
Motive, "Products | AI Dashcam—Smart, accurate, and responsive AI dash cams.", Motive Technologies, Inc., [publication date unknown]. URL: https://gomotive.com/products/dashcam/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 7 pages.
Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.
Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.
Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.
Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 16 pages.
Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 12 pages.
Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.
Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.
Motive, "Spec Sheet: AI Dashcam", Motive Technologies, Inc., accessed on Oct. 24, 2023 [publication date unknown], Document No. 2022Q3_1202788858717595, in 5 pages.

(56) References Cited

OTHER PUBLICATIONS

Motive, "Spec Sheet: Asset Gateway", Motive Technologies, Inc., accessed on Mar. 15, 2023 [publication date unknown], Document No. 2022Q1_849551229, in 6 pages.
Motive, "Take control of your fleet with Groups and Features Access.", Motive Technologies, Inc., Apr. 4, 2017, in 3 pages. URL: https://gomotive.com/blog/take-control-fleet-groups-features-access/.
Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j6l.
Motive, "The most accurate AI just got better.", Motive Technologies, Inc., Mar. 8, 2023, in 8 pages. URL: https://gomotive.com/blog/fewer-fleet-accidents-with-the-new-ai/.
Motive, "The Motive Driver App: Change current duty status in your driving log." [video], YouTube, Aug. 10, 2022, screenshot in 1 page. URL: https://www.youtube.com/watch?v=m4HPnM8BLBU.
Motive, "The Motive Driver App: Claim and correct unidentified trips." [video], YouTube, Sep. 13, 2022, screenshot in 1 page. URL: https://www.youtube.com/watch?v=z2_kxd3dRac.
Motive, "The Motive Driver App: Connect to the Vehicle Gateway." [video], YouTube, Sep. 13, 2022, screenshot in 1 page. URL: https://www.youtube.com/watch?v=egZmLYDa3kE.
Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.
Motive, "The Motive Driver App: Digitally record hours of service (HOS)." [video], YouTube, Aug. 10, 2022, screenshot in 1 page. URL: https://www.youtube.com/watch?v=gdexlb_zqtE.
Motive, "The Motive Driver App: Insert past duty driving log status." [video], YouTube, Aug. 10, 2022, screenshot in 1 page. URL: https://www.youtube.com/watch?v=TmOipFKPBeY.
Motive, "The Motive Driver App: Switch to DOT inspection mode to share driving logs." [video], YouTube, Aug. 10, 2022, screenshot in 1 page. URL: https://www.youtube.com/watch?v=S2LR1ZUImBU.
Motive, "The Motive Driver App: View hours of service (HOS) violations." [video], YouTube, Aug. 10, 2022, screenshot in 1 page. URL: https://www.youtube.com/watch?v=qJX2ZiBGtV8.
Motive, "U.S. speed limits. What drivers and fleets need to know.", Motive Technologies, Inc., Jan. 13, 2022, in 8 pages. URL: https://gomotive.com/blog/us-speed-limits-for-drivers/.
Motive, "What is an AI dashcam?", Motive Technologies, Inc., Jan. 21, 2022, in 6 pages. URL: https://gomotive.com/blog/what-is-ai-dashcam/.
Motive, "WiFi Hotspot sets you free from restrictive cell phone data plans.", Motive Technologies, Inc., Jun. 27, 2019, in 5 pages. URL: https://gomotive.com/blog/wifi-hotspot/.
Motive, "WiFi Hotspot", Motive Technologies, Inc., accessed on Feb. 18, 2024 [publication date unknown], in 5 pages. URL: https://gomotive.com/products/wifi-hotspot/.
Multivu.com, "Powerful Technology ER-SV2 Event Recorder", Lytx Inc., 2015, in 2 pages. URL: https://www.multivu.com/players/English/7277351-lytx-activevision-distracted-driving/document/52a97b52-6f94-4b11-b83b-8c7d9cef9026.pdf.
Nauto, "How Fleet Managers and Safety Leaders Use Nauto" [video], YouTube, Jan. 25, 2018, screenshot in 1 page. URL: https://www.youtube.com/watch?v=k_iX7a6j2-E.
Nauto, "The New World of Fleet Safety—Event Keynote" [video], YouTube, Jul. 9, 2020, screenshot in 1 page. URL: https://www.youtube.com/watch?v=iMOab9Ow_CY.
Netradyne Inc., "Netradyne Introduces New DriverStar Feature to Recognize and Reward Safe Driving", PR Newswire, Netradyne, Inc., Oct. 19, 2017, in 2 pages. URL: https://www.prnewswire.com/news-releases/netradyne-introduces-new-driverstar-feature-to-recognize-and-reward-safe-driving-300540267.html.
Netradyne India, "Netradyne Driveri Covered in BBC Click" [video], YouTube, Jan. 25, 2018, screenshot in 1 page. URL: https://www.youtube.com/watch?v=jhULDLj9iek.
Netradyne presentation, Netradyne, Oct. 2016, in 23 pages.
Netradyne, "Driver.i™ Catches No. Stop ad Stop Sign | Fleet Management Technology" [video], YouTube, Oct. 3, 2017, screenshot in 1 page. URL: https://www.youtube.com/watch?v=18sX3X02aJo.
Netradyne, "Driver.i™ Flags Commercial Driver Running Red Light - 360-degree vi" [video], YouTube, Oct. 3, 2017, screenshot in 1 page. URL: https://www.youtube.com/watch?v=au9_ZNGYCmY.
Netradyne, Driver Card 1, 2018, in 2 pages.
Netradyne, Driver Card 2, 2018, in 2 pages.
Ohidan, A., "Fiat And AKQA Launch Eco: Drive ™", Science 2.0, Oct. 7, 2008, in 4 pages. URL: https://www.science20.com/newswire/fiat_and_akqa_launch_eco_drive_tm.
Perez, L. et al., "Robot Guidance Using Machine Vision Techniques in Industrial Environments: A Comparative Review", Sensors, Mar. 2016, vol. 16(3), in 27 pages.
Puckett, T. et al. "Safety Track 4B- Driver Risk Management Program", Airports Council International, Jan. 18, 2019, in 29 pages. URL: https://airportscouncil.org/wp-content/uploads/2019/01/4b-DRIVER-RISK-MANAGEMENT-PROGRAM-Tamika-Puckett-Rob-Donahue.pdf.
Ramkumar, S. M. et al., "Chapter 14 Web Based Automated Inspection and Quality Management", in Web-Based Control and Robotics Education, 2009, ed., Spyros G. Tzafestas, Springer, in 42 pages.
Tzafestas, S. G. (ed.), Web-Based Control and Robotics Education, 2009, Springer, ISBN 978-90- 481-2504-3, in 362 pages. [uploaded in 3 parts].
Samsara Support, "AI Event Detection", Samsara Inc., accessed on Feb. 7, 2024 [publication date unknown]. URL: https://kb.samsara.com/hc/en-US/articles/360043619011-AI-Event-Detection#UUID-4790b62c-6987-9c06-28fe-c2e2a4fbbb0d (filed with Feb. 8, 2024ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Alert Configuration", Samsara Inc., accessed Feb. 7, 2024 [publication date unknown]. URL: https://kb.samsara.com/hc/en-us/articles/217296157-Alert-Configuration (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Samsara Support, "Alert Triggers", Samsara Inc., accessed Feb. 7, 2024 [publication date unknown]. URL: https://kb.samsara.com/hc/en-us/articles/360043113772-Alert-Triggers (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.
Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-f2f6-2c5a-3221-9432288c9b25 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Dash Cam Recording Logic", Samsara Inc., accessed on Feb. 7, 2024 [publication date unknown]. URL: https://kb.samsara.com/hc/en-us/articles/360011372211-Dash-Cam-Recording-Logic (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Dash Cam Settings Overview", Samsara Inc., accessed on Feb. 7, 2024 [publication date unknown]. URL: https://kb.samsara.com/hc/en-us/articles/360042037572-Dash-Cam-Settings-Overview (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Rolling Stop Detection", Samsara Inc., accessed on Feb. 7, 2024 [publication date unknown]. URL: https://kb.samsara.com/hc/en-us/articles/360029629972-Rolling-Stop-Detection (filed with Feb. 8, 2024 ITC Complaint, In the Matter of

(56) References Cited

OTHER PUBLICATIONS

Certain Vehicle Telematics, Fleet Management, and Video-Based Safety Systems, Devices, and Components thereof, Investigation No. 337-TA-3722), in 2 pages.
Samsara Support, "Safety Score Categories and Calculation", Samsara Inc., [publication date unknown]. URL: https://kb.samsara.com/hc/en-us/articles/360045237852-Safety-Score-Categoriesand-Calculation (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Safety Score Weights and Configuration", Samsara Inc., accessed Feb. 7, 2024 [publication date unknown]. URL: https://kb.samsara.com/hc/en-us/articles/360043160532-Safety-Score-Weights-and-Configuration#UUID-fcb096dd-79d6-69fc-6aa8-5192c665be0a_sectionidm4585641455801633238429578704 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "AI Dash Cams", Samsara, Inc., [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Samsara, "CM31 Dash Camera Datasheet - Internet-Connected Front-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "CM32 Dash Camera - Internet-Connected Dual-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara, "Unpowered Asset Tracker AG45 Datasheet", accessed Feb. 21, 2024 [publication date unknown], in 4 pages. URL: https://www.samsara.com/pdf/docs/AG45_Datasheet. pdf.
Samsara, "Vehicle Gateways—VG34, VG54, VG54H Datasheet", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.
Sindhu MV, "How this three-year-old Bengaluru startup is helping make US roads safer with its video analytics solutions", Yourstory.com, Mar. 26, 2018, in 7 pages. URL: https://yourstory.com/2018/03/lightmetrics-road-safety-analytics.
Smart Dash Cam Vezo360!, "Vivek Soni Co-Founder at Arvizon" [video], YouTube, Feb. 21, 2019, screenshot in 1 page. URL: https://www.youtube.com/watch?v=leclwRCb5ZA.
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.
Song, T. et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 pages.
Soumik Ukil, " LightMetrics ADAS demo" [video], YouTube, Jul. 20, 2017, screenshot in 1 page. URL: https://www.youtube.com/watch?app=desktop&v=9LGz1007dTw.
Steger, C. et al., "Chapter 2 Image Acquisition" and "Chapter 3 Machine Vision Algorithms", in Machine Vision Algorithms and Applications, 2018, 2nd ed., Wiley, in 604 pages.
Steger, C. et al., *Machine Vision Algorithms and Applications*, 2018, 2nd ed., Wiley, in 60 pages.
Straight, B. " Over 20 years later, Lytx continues to evolve alongside the industry it serves", FreightWaves, Apr. 16, 2019, in 4 pages. URL: https://www.freightwaves.com/news/technology/the-evolution-of-lytx.
Straight, B., "Netradyne using AI to provide intelligent insight into distracted driving", Netradyne, Inc., Nov. 8, 2017, in 4 pages. URL: https://https://www.freightwaves.com/news/2017/11/7/netradyne-using-ai-to-provide-intelligent-insight-into-distracted-driving.
Su, C.-C. et al., "Bayesian depth estimation from monocular natural images", Journal of Vision, 2017, vol. 17(5):22, pp. 1-29.
Sung, T.-W. et al., "A Speed Control Scheme of Eco-Driving at Road Intersections", 2015 Third International Conference on Robot, Vision and Signal Processing, 2015, pp. 51-54.
Suppose U Drive, "New Trucking Tech: Forward Facing Cameras" supposeudrive.com, Mar. 15, 2019, in p. 7. URL: https://supposeudrive.com/new-trucking-tech-forward-facing-cameras/.
The Wayback Machine, "AT&T Fleet Complete—Give your Business a competitive advantage ", AT&T, 2019, in 12 pages. URL: https://web.archive.org/web/20190406125249/http:/att.fleetcomplete.com/.
The Wayback Machine, "Introducing Driver-I ™", NetraDyne, Sep. 22, 2016, in 4 pages URL: https://web.archive.org/web/20160922034006/http://www.netradyne.com/solutions.html.
The Wayback Machine, "NetraDyne's Driver-I ™ TM platform delivers results beyond legacy safety video systems Counting safe driving as safe driving—taking second-guessing out of commercial fleet driver safety", NetraDyne, Feb. 9, 2018, in 7 pages. URL: https://web.archive.org/web/20180209192736/http:/netradyne.com/solutions/.
Top Fives, "15 BIGGEST Data Centers on Earth" [video], YouTube, Jun. 9, 2024, screenshot in 1 page. URL: https://www.youtube.com/watch?v=1LmFmCVTppo.
Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.
Vezo 360, "World's Smartest Dash Cam Powered by AI" [video], YouTube, Mar. 31, 2019, screenshot in 1 page. URL: https://www.youtube.com/watch?v=M5r5wZozSOE.
Vlahogianni, E. et al., "Driving analytics using smartphones: Algorithms, comparisons and challenges", Transportation Research Part C, Jun. 2017, vol. 79, pp. 196-206.
Wahlstrom, J. et al., "Smartphone-based Vehicle Telematics—A Ten-Year Anniversary", IEEE Transactions on Intelligent Transportation Systems, Nov. 2016, vol. 18(10), in 23 pages.
Wu, S., "Motivating High-Performing Fleets with Driver Gamification", Samsara, Feb. 2, 2018, in 4 pages. URL: https://www.samsara.com/blog/motivating-high-performing-fleets-with-driver-gamification/.
Yufeng, Z. et al., "3G-Based Specialty Vehicles Real-Time Monitoring System", Applied Mechanics and Materials, Feb. 2014, vols. 513-517, pp. 871-875.
Yufeng, Z. et al., "3G-Based Specialty Vehicles Real-Time Monitoring System", Applied Mechanics and Materials, Feb. 2014, vols. 513-517, pp. 871-875, in 7 pages.
Zanini, M. et al., "Mobile Assets Monitoring for Fleet Maintenance", SAE International, Apr. 11-14, 2005, in 9 pages.
Zanini, M. et al., "Mobile Assets Monitoring for Fleet Maintenance", SAE International, 2005, pp. 369-375, in 8 pages.
Zhong, R. Y. et al., "Intelligent Manufacturing in the Context of Industry 4.0: A Review", Engineering, Oct. 2017, vol. 3, Issue 5, pp. 616-630.
"5 Minutes", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0014).
"Fleet Dashcam Solution—Vision Mobile App", Fleet Complete, accessed on May 16, 2024 [publication date unknown], in 13 pages. URL: https://www.fleetcomplete.com/products/old-vision-xxxxxx/.
"Fleet Complete Vision Brings Intelligent Video Analytics to Advance Fleet Safety", Fleet Complete, Apr. 5, 2018, in 1 page. URL: https://www.fleetcomplete.com/fleet-complete-vision-brings-intelligent-video-analytics-to-advance-fleet-safety/.

(56) References Cited

OTHER PUBLICATIONS

"Fuelopps" [archived webpage], Propel It, archived on Nov. 14, 2017, in 3 pages. URL: https://web.archive.org/web/20171114184116/http://www.propelit.net:80/fuelopps2.
"Fuelopps", Propel It, [publication date unknown], in 1 page (PROPEL-IT-1393_00001).
"FuelOpps™ Delivers for Covenant Transportation Group - Improved driver behavior contributes to a 3+% MPG improvement in less than 12 months", FuelOpps by Propel IT, [publication date unknown], in 2 pages.
"FuelOpps ™ Version 2.0" [presentation], Propel IT, Inc., [publication date unknown], in 17 pages.
"Our Products" [archived webpage], Propel It, archived on Aug. 3, 2018, in 2 pages. URL: https://web.archive.org/web/20180803052120/http://www.propelit.net: 80/our-products-1.
"Our Products" [archived webpage], Propel It, archived on Aug. 3, 2018, in 2 pages. URL: https://web.archive.org/web/20180803052120/http://www.propelit.net:80/our-products-1 (MOTIVE-ITC-1393-0024677).
"Our Story", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0015).
"Safetyopps" [archived webpage], Propel It, archived on Nov. 14, 2017, in 3 pages. URL: https://web.archive.org/web/20171114183538/http://www.propelit.net:80/safetyopps2.
"Safetyopps", Propel It, [publication date unknown], in 1 page (PROPEL-IT-1393_00019).
Gallagher, J., "KeepTruckin's AI Focus driving down costs for customers", FreightWaves, Dec. 9, 2019, in 4 pages. URL: https://www.freightwaves.com/news/ai-focus-vaults-keeptruckin-higher-on-freighttech-25-list.
Netradyne, Warnings, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 2 pages (ND_ITC_0005-ND_ITC_0006).

* cited by examiner

ARTIFICIAL INTELLIGENCE INSPECTION ASSISTANT

TECHNICAL FIELD

Embodiments of the present disclosure relate to devices, systems, and methods that employ customized artificial intelligence to assist in inspections of an item, such as a vehicle.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Completing inspection reports may be tedious and require significant human judgment and data input. This introduces the possibility of human error, in missing or not recognizing an inspection feature of interest, for example. Additionally, performing an inspection may be very time consuming, such as by requiring a human user to manually inspect an item (e.g., a vehicle) and then type the information into an inspection report documenting the results of the inspection.

SUMMARY

The systems, methods, and devices described herein each have several aspects, no single one of which is solely responsible for its desirable attributes. Without limiting the scope of this disclosure, several non-limiting features will now be described briefly.

During a vehicle inspection, an inspector uses an inspection application on a tablet (or other mobile device with a camera) that displays an inspection checklist, such as an overview of completed vs non-completed inspection items. The inspection checklist may be a simple checklist (e.g., text and a checkbox for each inspection item) or a more detailed checklist (e.g. a wireframe image of the vehicle with missing items highlighted in a different color). The inspection application may record (e.g., photo, video, sound, etc.) portions of a vehicle that are then analyzed by an inspection assistant system, in communication with a large language model and/or other artificial intelligence systems, to update an electronic inspection report. The inspection application may allow for various input methods such as video, documents, voice, and text to ensure that all necessary checks are completed accurately and efficiently.

Video recording, for example, may be used to capture permanently footage of items to be checked. For example, the inspector may record a video of each tire to check its tread depth or take a picture of the odometer. If the input imagery matches any of the inspection report's items, it may be recorded and marked as completed. With reference to document scanning, the user can point the camera at paperwork such as vehicle registration documents to start the inspection process for that particular vehicle. Other documents like logbook pages may also be scanned using this method. Voice input is another option available to users who prefer not to type out their observations manually. Voice recordings may be converted into text and interpreted by the system, which matches it with checklist items. For example, an inspector might say "mirrors, lights, horn tested OK" or "clutch feels spongy," while taking a photo of the tire at the same time. The voice recording may be combined with video to associate images with the correct category. Additionally, users can still fill out report items manually using text input. However, they are not restricted by going over form elements and can type freeform text which will be allocated into the correct category based on context analysis. For example, an inspector might write "cabin interior ok," which may check off all items related to the cabin interior section of the inspection report.

Overall, these various input methods provide flexibility for vehicle inspectors during their inspection process and ensure that each item is accurately recorded without requiring manual data entry.

In addition to simplified data entry, an inspection assistant system may provide immediate feedback to the user in several ways. For example, the system may confirm which item has been detected and recorded by displaying (or speaking) a message such as "Odometer state recorded at **223*k*** miles." This may help the inspector stay organized and aware of what has been completed during the inspection process. If, however, an image or text does not resolve a checklist item (e.g., it is ambiguous), the system may talk back to explain what is missing. For example, if the fire extinguisher was not visible from the images taken by the user, the system may say "Please verify that the fire extinguisher is not expired." This may help ensure that all necessary checks are completed accurately and reduce potential safety issues caused by missed items.

Additionally, if requirements of an inspection are unclear or if the inspector needs clarification on a specific item, they can directly ask questions using voice input or freeform text. The inspection assistant system may know the context based on previous inputs. For example, vehicle type may be known based on a registration document that was scanned by the inspector at the beginning of the inspection. For example, an inspector might say "where can I find the reflective triangle?" and the system would provide a response to help complete the inspection process accurately and efficiently.

Implementation of these example inspection assistant functionalities are described in further detail below. The inspection assistant system makes use of a generative language model (e.g., an LLM) that is instructed, through one or more prompts, to guide users through the inspection flow by interpreting text, image, video, or voice data. In an example implementation, an index prompt, which may include text, photos, video, etc., is initially provided to the LLM, which results in the LLM returning one or more report components (e.g., vehicle components or report sections) associated with the index prompt. For example, an index prompt may result in the LLM identifying a report component such as "tires," "odometer report," or "vehicle registration."

A component prompt may be defined for each set of components to be reviewed in an inspection report. A component prompt may provide detailed instructions on what is requested for each item in the report, including different ways users can provide additional information that may be needed, such as verbally or by image. Component prompts may help guide the LLM to determine which information to extract from media and also give feedback if user-provided data is incomplete or if the user has a question about what to provide in the report.

For some use cases, a specialized model may be called to perform tasks such as OCR on a vehicle registration or odometer, estimate tire tread depth from an image, write any recorded data into a report data store, and/or any other tasks that may be more efficiently performed by a specialized model. The report data store may be accessed as updates are made, or periodically, to cause the inspection assistant to display portions of the inspection report for user review and provide additional context for the rest of the inspection.

The inspection assistant system may also make use of Question-Answer (QA) prompts to the LLM, which may be triggered, for example, if a response to the index prompt indicates that the user issued a knowledge question about inspection requirements. A QA prompt may be connected to a backend domain-specific knowledge bases (or other service) pulled in via RAG, which may allow for more precise answers once metadata (e.g., vehicle registration) has been scanned and is available in the report status. Overall, this system provides an efficient and accurate way for users to complete vehicle inspections.

The various embodiments and implementations of an inspection assistant system that communicates with a vehicle inspection application may be used in examination of other items. For example, an inspection assistant system for homes/buildings could have component prompts for checking electrical wiring, plumbing systems, roof condition, foundation stability, etc., while also handling QA inquiries about local building codes or maintenance requirements. Similarly, an aircraft inspection assistant could focus on components such as wings, engines, landing gear, and cockpit instruments, with prompts tailored to this domain. By leveraging the same core language model and generative capabilities across different domains, these inspection assistants can provide consistent guidance while also being customized for each specific use-case.

In some aspects, the techniques described herein relate to a vehicle inspection computing system including: a hardware computer processor; and a non-transitory computer readable medium having software instructions stored thereon, the software instructions executable by the hardware computer processor to cause the computing system to perform operations including: displaying, on a display of the computing system, a user interface including at least a portion of a vehicle inspection report including a plurality of inspection categories; obtaining inspection data associated with a vehicle; generating a prompt including at least a portion of the inspection data and information regarding inspection features to be identified by a large language model; transmitting the prompt to the large language model; receiving, from the large language model, a response indicating any inspection features identified in the inspection data; and update the vehicle inspection report to indicate any inspection features identified by the large language model.

In some aspects, the techniques described herein relate to a computing system, wherein the inspection data includes one or more of a photograph, video, audio, or text.

In some aspects, the techniques described herein relate to a computing system, wherein the inspection features include one or more of a potential change, defect, status, or compliance feature In some aspects, the techniques described herein relate to a computing system, wherein the vehicle inspection computing system includes a mobile computing device.

In some aspects, the techniques described herein relate to a computing system, wherein the vehicle inspection computing system includes a mobile computing device in communication with an inspection assistant system.

In some aspects, the techniques described herein relate to a computing system, wherein the large language model is a multimodal model configured to receive and analyze images or videos.

In some aspects, the techniques described herein relate to a computing system, wherein the prompt requests identification of at least one component from among tires, body, engine, interior, suspension, brakes, electrical, transmission, steering, odometer report, and vehicle registration based on the inspection data.

In some aspects, the techniques described herein relate to a computing system, wherein the response from the large language model indicates that additional inspection information is required for a particular inspection component.

In some aspects, the techniques described herein relate to a computing system, wherein the additional inspection information including one or more of an additional photo, video, audio, or text.

In some aspects, the techniques described herein relate to a computing system, wherein the operations further include: generating and transmitting an updated prompt to the large language model including at least some of the additional inspection information.

In some aspects, the techniques described herein relate to a computing system, wherein updating the vehicle inspection report includes transmitting the updated report to an external system for further processing or review by a third party.

In some aspects, the techniques described herein relate to a computing system, wherein receiving inspection data includes obtaining image data from one or more cameras of the vehicle inspection computing system.

In some aspects, the techniques described herein relate to a computerized method, performed by a user device having one or more hardware computer processors and one or more non-transitory computer readable storage device storing an inspection application executable by the user device to perform the computerized method including: display instructions on a display of the user device for the user to obtain inspection information of a vehicle, the inspection information including at an image of at least a portion of the vehicle or information related to the vehicle; transmitting a prompt to a large language model to identify a vehicle component included in the inspection information; receiving a response from the large language model indicating that additional inspection information regarding an identified vehicle component is needed; displaying instructions on the display of the user device for the user to obtain the additional inspection information; transmitting an updated prompt including at least a portion of the additional inspection information to the large language model; and receiving a response from the large language model indicating one or more inspection features of the identified vehicle component.

In some aspects, the techniques described herein relate to a computerized method, wherein said transmitting the prompt to the large language model is initiated in response to a user input indicating that inspection information has been obtained for analysis.

In some aspects, the techniques described herein relate to a computerized method, wherein the user input is provided via a hardware button of the user device or a software interface element of the inspection application.

In some aspects, the techniques described herein relate to a computerized method, wherein said transmitting the prompt to the large language model is initiated automatically in response to the inspection information being acquired by the user device.

In some aspects, the techniques described herein relate to a computerized method, wherein the inspection information includes a video stream that is periodically transmitted to the large language model.

In some aspects, the techniques described herein relate to a computerized method, wherein the inspection information includes a video stream and the computerized method further includes: analyzing the video stream with an image processing module to detect vehicle components in the video stream; and extracting one or more still images from the video stream that include the detected vehicle component, wherein the one or more still images are included in the inspection information transmitted to the large language model.

In some aspects, the techniques described herein relate to a computerized method, wherein said transmitting the prompt to the large language model is initiated automatically in response to the inspection information being acquired by the user device.

In some aspects, the techniques described herein relate to a computerized method, further including: updating an inspection report to include the one or more inspection features in associated with the identified vehicle component.

In some aspects, the techniques described herein relate to a computerized method, further including: displaying at least a portion of the inspection report, wherein the inspection report includes user interface options allowing the user to confirm or reject the one or more inspection features associated with the identified vehicle component.

In some aspects, the techniques described herein relate to a computerized method, wherein the inspection report further includes a user interface option allowing the user to request display of the inspection information associated with the detected inspection features.

Various embodiments of the present disclosure provide improvements to various technologies and technological fields, and practical applications of various technological features and advancements. Various embodiments of the present disclosure provide significant improvements over such technology, and practical applications of such improvements. Additionally, various embodiments of the present disclosure are inextricably tied to, and provide practical applications of, computer technology.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Figure 1A:
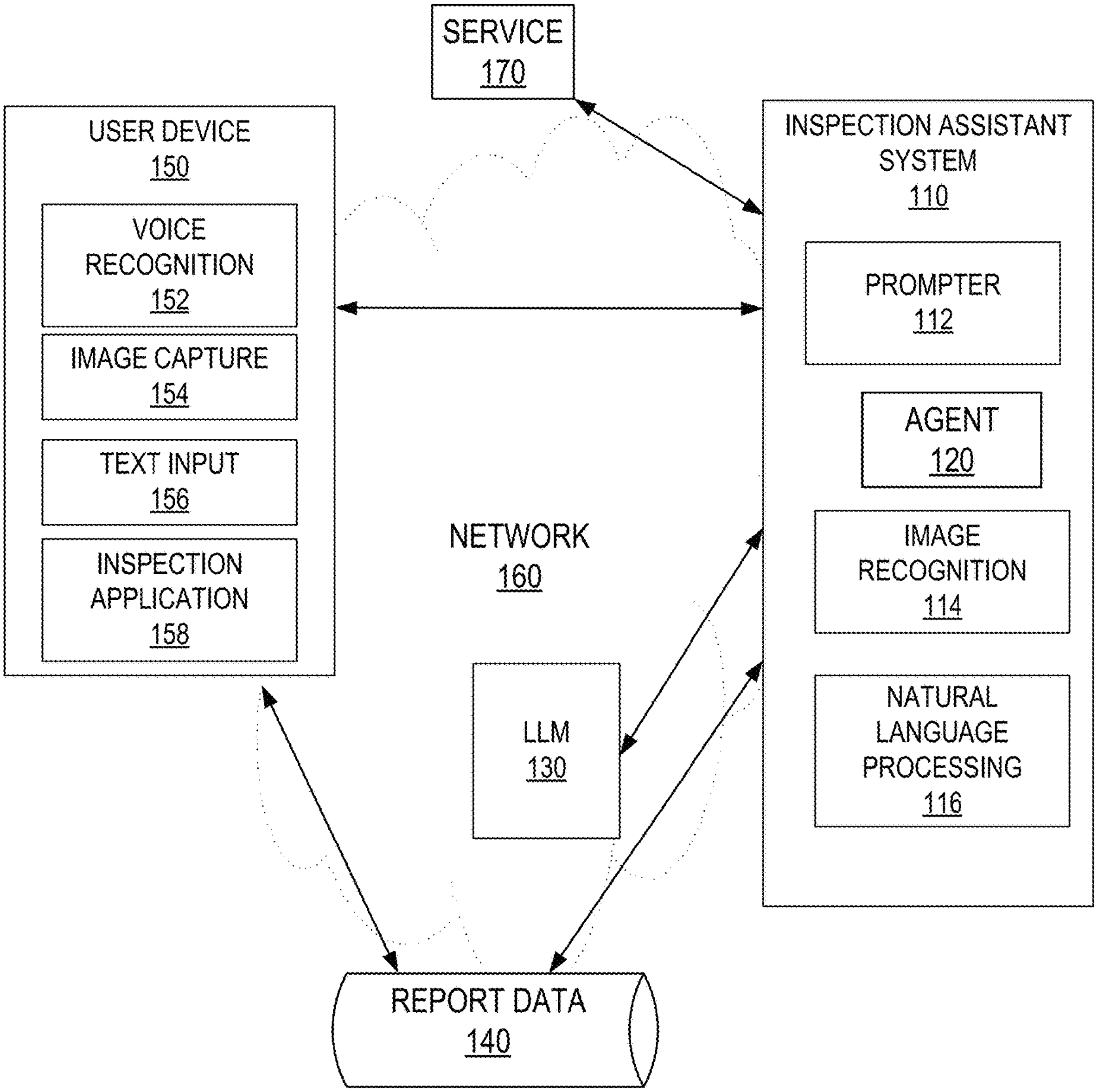
FIG. 1A is a block diagram illustrating one example of components and communications between a user device and various components of an Inspection Assistant System (IAS).

Although certain preferred implementations, embodiments, and examples are disclosed below, the inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

The following description includes discussion of various processes and components that may perform artificial intelligence ("AI") processing or functionality. AI generally refers to the field of creating computer systems that can perform tasks that typically require human intelligence. This includes understanding natural language, recognizing objects in images, making decisions, and solving complex problems. AI systems can be built using various techniques, like neural networks, rule-based systems, or decision trees, for example. Neural networks learn from vast amounts of data and can improve their performance over time. Neural networks may be particularly effective in tasks that involve pattern recognition, such as image recognition, speech recognition, or Natural Language Processing.

Natural Language Processing (NLP) is an area of artificial intelligence (AI) that focuses on teaching computers to understand, interpret, and generate human language. By combining techniques from computer science, machine learning, and/or linguistics, NLP allows for more intuitive and user-friendly communication with computers. NLP may perform a variety of functions, such as sentiment analysis, which determines the emotional tone of text; machine translation, which automatically translates text from one language or format to another; entity recognition, which identifies and categorizes things like people, organizations, or locations within text; text summarization, which creates a summary of a piece of text; speech recognition, which converts spoken language into written text; question-answering, which provides accurate and relevant answers to user queries, and/or other related functions. Natural Language Understanding (NLU), as used herein, is a type of NLP that focuses on the comprehension aspect of human language. NLU may attempt to better understand the meaning and context of the text, including idioms, metaphors, and other linguistic nuances.

A Language Model is any algorithm, rule, model, and/or other programmatic instructions that can predict the probability of a sequence of words. A language model may, given a starting text string (e.g., one or more words), predict the next word in the sequence. A language model may calculate the probability of different word combinations based on the patterns learned during training (based on a set of text data from books, articles, websites, audio files, etc.). A language model may generate many combinations of one or more next words (and/or sentences) that are coherent and contextually relevant. Thus, a language model can be an advanced artificial intelligence algorithm that has been trained to understand, generate, and manipulate language. A language model can be useful for natural language processing, including receiving natural language prompts and providing natural language responses based on the text on which the model is trained. A language model may include an n-gram, exponential, positional, neural network, and/or other type of model.

A Large Language Model (LLM) distinguishes itself from regular language models by its extensive training on a much larger data set and a significantly higher number of training parameters. This advanced training enables an LLM to discern complex patterns and produce text that is both coherent and contextually accurate, making it adept at handling a broad spectrum of topics and tasks. An LLM operates by processing input text and iteratively predicting subsequent words or tokens, which could be parts of words, word combinations, punctuation, or their mixtures. LLMs come in various forms, including Question Answer (QA) LLMs optimized for context-based answer generation, multimodal LLMs, among others.

An LLM, as well as other models discussed in this disclosure, may incorporate neural networks (NNs) trained through self-supervised or semi-supervised learning, including feedforward or recurrent NNs. They may also feature attention-based or transformer architectures. Particularly useful in natural language processing, LLMs excel at interpreting natural language prompts and generating natural language responses based on their training data. However, they typically lack awareness of data security or data permissions, as they do not retain permissions information from their training text, which may limit their response scope in permissions-sensitive contexts.

While this specification primarily focuses on LLMs and AI models, the mentioned aspects and implementations can be applied using other types of models like other generative AI models, machine learning (ML) models, multimodal models, or other algorithmic processes.

In different implementations, the LLMs and other models (including ML models) described herein can be hosted locally, managed in the cloud, or accessed through Application Programming Interfaces (APIs). They can also be implemented using electronic hardware such as a graphics processing unit (GPU), or application-specific processors, for example, Application-Specific Integrated Circuits (ASICs) or Field Programmable Gate Arrays (FPGAs). The data used by an LLM, such as in model inputs, outputs, training data, or modeled data, can encompass a wide array, including text, files, documents, emails, images, audio, video, databases, metadata, geospatial data, web pages, and sensor data, among others.

FIG. 1A is a block diagram illustrating one example of components and communications between a user device 150 and various components of an Inspection Assistant System (IAS) 110. In this example, the IAS 110 is configured to communicate with an LLM 130 to provide information relevant to inspection of an item, such as an item that is periodically inspected for potential changes, defects, status, security measures, compliance, performance, etc. For ease of discussion, this disclosure discusses examples of vehicle inspections. However, the systems and methods discussed here are equally applicable to inspection of any other item, such as homes/buildings, aircrafts, railway infrastructure, industrial equipment, shipping containers, maritime equipment, public infrastructure (e.g., bridges), historical monuments, art, agricultural equipment, farm equipment, irrigation systems, crops, animals, patients, etc. In other implementations, the functionality of certain components of the IAS 110, the user device 150, or other devices discussed herein, may be performed by other components and/or may be combined or separated for performance by other components.

In the example of FIG. 1A, the various devices are in communication via a network 160, which may include any combination of networks, such as a local area network (LAN), personal area network (PAN), wide area network (WAN), the Internet, and/or any other communication network. Communications between devices may be wireless and/or wired, such as via any existing communication protocols. Modules of the illustrated components, such as voice recognition 152, image capture 154, text input 156, prompter 112, agent 120, image recognition 114, or natural language processing 116 may communicate via an internal bus of their respective device, such as the user device 150 or IAS 110, and/or via the network 160. The user device 150 may be a smartphone, tablet, desktop computer, laptop, smartwatch, e-reader, gaming console, virtual/mixed/augmented reality device, smart glasses, personal digital assistant, and/or other similar device.

In this example, the user device 150 (which may refer to a computing device of any type that is operated by human user) executes an inspection application 158 to generate user interfaces that generally guide the user through the inspection of an item, such as a vehicle, and complete an inspection report. The inspection application 158 may be a website (e.g., accessed via a browser or similar application on the user device 150) or standalone application, such as a vehicle inspection application that is downloaded, stored, and executed on the user device 150.

In the example of FIG. 1A, the user interacts with the inspection application 158 to acquire information regarding an inspection item, e.g., a vehicle, that may be provided to the IAS 110 ("inspection information") to determine status of the vehicle, identify potential issues, and/or provide any other inspection information that may be useful in performing a vehicle inspection. For example, the user device 150 includes a voice recognition module 152 that is configured to receive voice input from the user and initiate voice-to-text conversion of the spoken words in the voice input. The inspection application 158 may be configured to include some or all of the voice input (e.g., as part of an audio or video file) and/or text of the voice input as part of the inspection information that is transmitted to the IAS 110. The example user device 150 also includes an image capture component 154, such as one or more cameras or other optical sensors. The image capture component 154 may obtain still images or video in various sizes, formats, etc. The user device 150 also includes a text input module 156 configured to receive text that is input by the user, such as on a physical or touch screen keyboard of the user device 150. The inspection application 158 may be configured to transmit some or all of the data obtained by the modules 152, 154, 156, collectively referred to as "inspection information," to the IAS 110. For example, the inspection application 158 may be configured to filter information obtained from the modules 152, 154, 156 to reduce the amount of inspection information transmitted to the IAS 110. The IAS 110, in turn, analyzes the inspection information and communicates some or all of the inspection information in one or more prompts to an LLM 130 with a request to identify inspection features of interest, such as identifying information, status, or possible issues with the item or item components. The inspection features identified by the LLM 130 may then be used by the IAS 110, the inspection application 158, an inspection server (e.g., provider of the inspection application), and/or other component to suggest, and/or automatically implement, updates to an inspection report.

In the example of FIG. 1A, the IAS 110 includes a prompter 112 that is generally configured to communicate with the LLM 130, one or more agents 120, and one or more services 170. In some embodiments, the prompter 112 is an agent 120 (or part of an agent 120), and may include some or all of the components and functionality discussed herein with reference to agent 120. The prompter 112 may generate and send prompts to the LLM 130 and receives responses from the LLM 130, in a series of one or more "turns," or back-and-forth communications between the IAS 110 and the LLM 130. The prompter 112 may work in conjunction with one or more agents 120, which may each include a memory, tools, and a planning module. In some implementations, the prompter performs any necessary agent functions and separate agents are not used. For ease of description, the discussion herein may refer to a single agent, but the IAS 110 may include and/or may communicate with multiple agents 120 in a similar manner as discussed herein. Thus, a reference to an agent 120 should be interpreted to also include communications with multiple agents 120.

In general, an agent memory stores data, information, and knowledge used by the agent 120 to perform tasks or make decisions. This may include both short-term memory for temporary storage of variables and long-term memory for storing learned patterns, rules, or historical contexts, for example. The memory can be implemented using various techniques such as databases, hash tables, or neural networks, depending on the specific requirements and constraints of the IAS 110. The agent tools are generally software components that provide functionalities for the agent 120 to interact with their environment, manipulate data, or perform tasks. The tools may include data processing algorithms, such as algorithms for pattern recognition, natural language processing, or image analysis, or interfaces for interacting with external systems, such as making data requests to a service 170. Tools can be integrated into the agent's memory or operate independently. The agent planning module is generally responsible for generating actions or decisions that the agent 120 executes to achieve its goals or solve problems. The planning module may use information from the memory, tools, and/or external inputs to evaluate different options, predict outcomes, and/or select the best course of action based on predefined rules, heuristics, or machine learning models, for example. The planning module importantly enables the agent 120 to adapt to changing situations, learn from experience, and make informed decisions in complex environments.

In the example of FIG. 1A, the IAS 110 includes various modules that may be used to analyze the inspection information received from the user device and/or inspection features received from the LLM 130. In the example IAS 110 of FIG. 1A, an image recognition module 114 is configured to perform various image analysis functions on images (which generally includes still photographs or video) received from the user device 150. For example, the image recognition module 114 may be configured to identify a portion of the vehicle included in a photograph, which may include execution of one or more specialized models that are configured to identify vehicle components. In some embodiments, the image recognition module includes a machine language ("ML") classifier configured to automatically detect objects (e.g., tires) and conditions/statuses of those objects (e.g., low tread on tires) in a photo or video. For example, a ML classifier may be trained based on a dataset of images (e.g., images of vehicles) with objects in the images (e.g., tires) manually or automatically labeled. The ML classifier may then be used to analyze new, unseen images (e.g., of a vehicle that is being inspected) to detect and identify the presences of trained objects. In some embodiments, the IAS 110 may then compare identified objects, which may include specific characteristics of the identified objects (e.g., tread depth of a detected tire), with existing information about the object, such as information is in a vehicle database or previous inspection report regarding the same object, and automatically update the inspection report from the old status/condition to the new status/condition.

In some implementations, the image recognition module 114 may identify components of interests in a video feed, such as vehicle components that are relevant to a vehicle inspection. The image recognition module 114 may pull single frames (e.g., a screenshot) of the video image at points of the video that best show the component(s) of interest. These still images may then be part of the inspection information that is transmitted to the LLM. In some implementations, the image recognition module 114 communicates with the LLM 130 or another LLM, such as a lighter-weight LLM, to identify the image that best shows a component of interest. For example, multiple single frame images of a video clip may be transmitted to the LLM with a request to identify the image that best identifies the component, and then use that identified image as an input to the LLM 130 to identify potential issues with that component. In some embodiments, some or all of the image recognition module 114 may be included in the user device 150. In some embodiments, and depending on capabilities of the LLM 130, some or all of the functionality provided by the modules 114, 116, may be performed by the LLM 130. For example, still images and/or video directly from the user device 150 may be included in a prompt to an LLM (e.g., a multimodal LLM) with a request to perform any of the processing discussed herein with reference to the image recognition module 114. In some implementations, the LLM 130 is a multimodal LLM.

In the example of FIG. 1A, the natural language processing module 116 is generally configured to process voice data from the user device 150 and determine a meaning or purpose of the voice data. The NLP module 116 may include speech recognition, natural language understanding, and/or natural language generation capabilities that enable conversion of spoken words into text or digital data, interpretation of the spoken words, including identifying entities, intentions, and/or contextual information, and/or generating human-like responses based on the interpreted meaning. In some embodiments, some or all of the natural language processing module 116 may be included in the user device 150. In some embodiments, and depending on capabilities of the LLM 130, some or all of the functionality provided by the modules 114, 116, may be performed by the LLM 130. For example, audio and/or video files directly from the user device 150 may be included in a prompt to an LLM (e.g., a multimodal LLM) with a request to perform any of the processing discussed herein with reference to the NLP module 116.

In some implementations, functions performed by the image recognition module 114 and/or natural language processing module 116 may be performed partially or wholly by the LLM 130, such as in the implementation where LLM 130 is a multimodal LLM that accepts not only text input, but also images, video, sound, and/or other file types. Thus, in those embodiments, a photo or video received in the inspection information from the user device 150, e.g., as part of, or associated with, a prompt generated by the prompter 112, may be provided to the LLM 130 for the LLM to identify features of interest, such as to identify a portion of a vehicle included in the image data (still image or video), specifications of components in the image data (e.g., tire tread depth) and/or possible defects (e.g., dents) of those components in the image data. Thus, in some embodiments the IAS 110 may not communicate with a separate image recognition module 114 and/or natural language processing module 116.

Figure 1B:
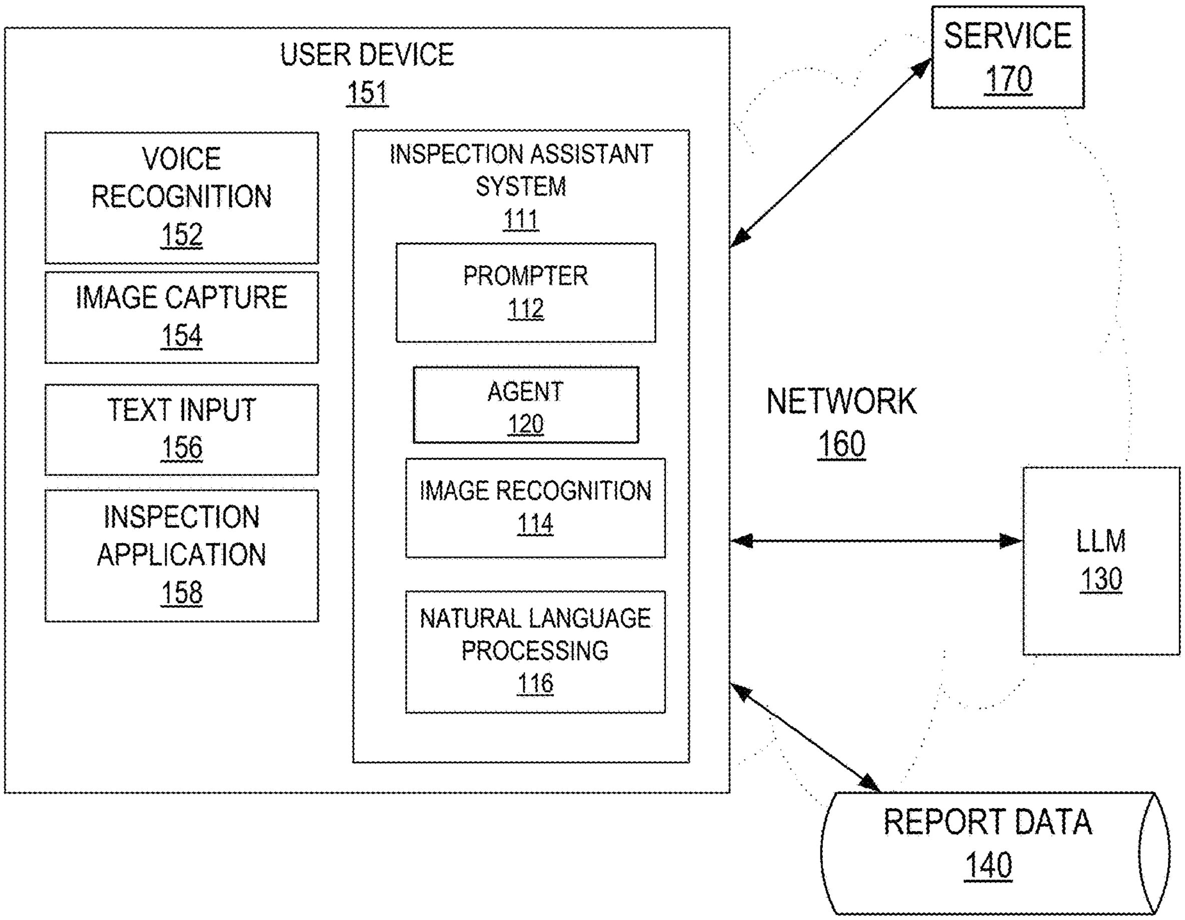
FIG. 1B is a block diagram illustrating one example of a user device executing an inspection application that includes components of the Inspection Assistant System (IAS).

FIG. 1B illustrates an example embodiment of a user device 151 that includes some or all of the modules and functionality as discussed above with reference to the IAS 110 as part of IAS 111. In this example, the inspection application 158 may communicate with the IAS 111, which may then communicate with the LLM 130, service 170, and the report data 140 in the same manner as discussed above with reference to IAS 110. Thus, in the example of FIG. 1B, the inspection application on the user device includes the same modules and performs the same functions as the IAS 110 of FIG. 1A. In other embodiments, the modules and functions of the IAS 110 or 111 may be distributed differently between two or more devices.

Figure 2:
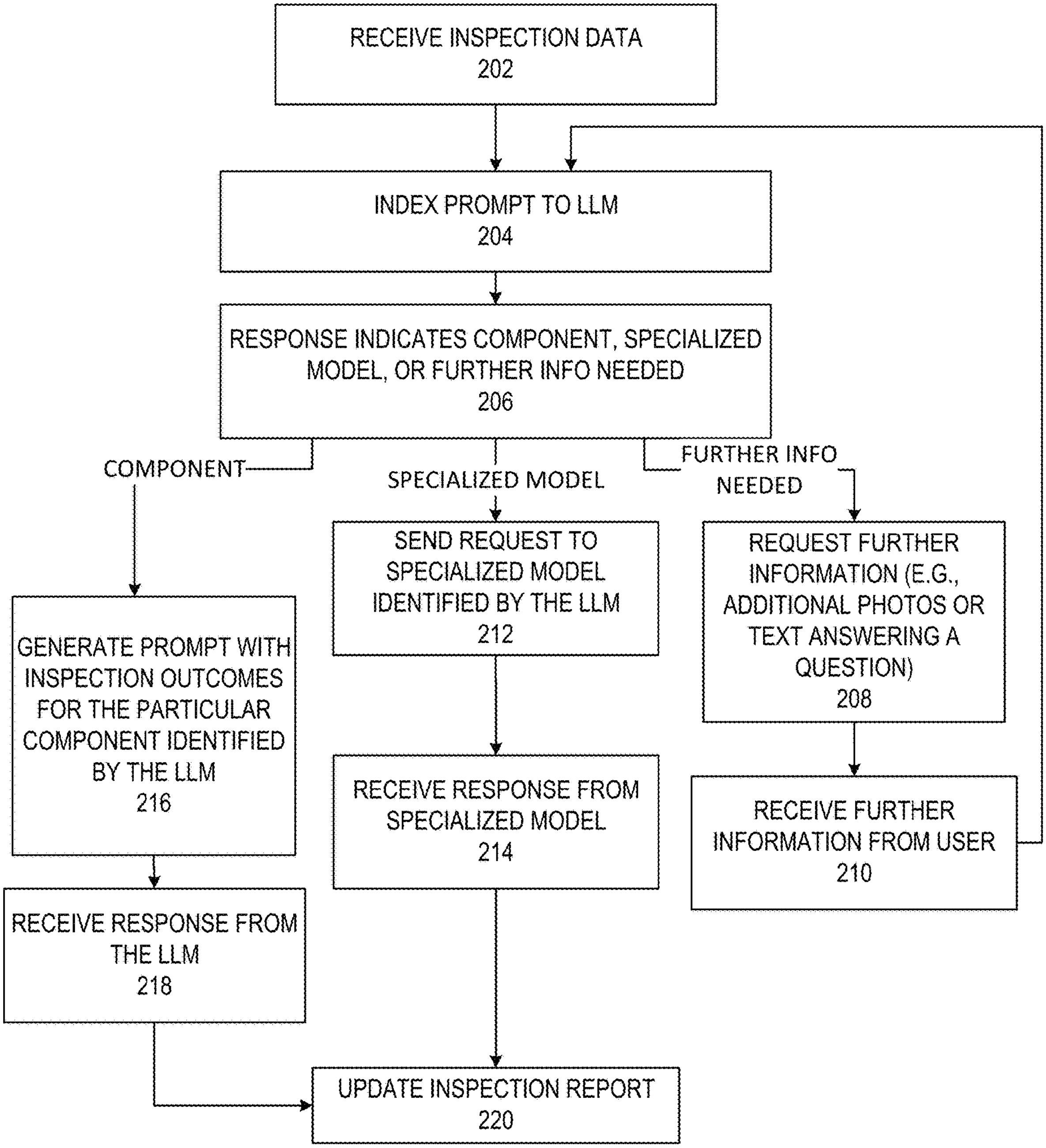
FIG. 2 is a high-level flowchart of an example process that may be performed by the IAS to automate and optimize an inspection process.

FIG. 2 is a high-level flowchart of an example process that may be performed by the IAS 110 to automate and optimize an inspection process. Depending on the embodiment, the process may include fewer or additional blocks and/or the blocks may be performed in an order different than is illustrated in the example of FIG. 2.

Beginning at block 202, inspection information including image data is received by the IAS 110. In some embodiments, the inspection information received at block 202 may include a question from the user, such as in the form of text, a voice clip, or selection of a help for further information button in the inspection application. In some embodiments, image data is received in the form of photographs taken by the user device 150. In some embodiments, the image data is in the form of a video clip received from the user device 150. In such an embodiment, the IAS 110 may be configured to extract frames from the video clip that may be sent to the LLM 130. In some embodiments, some or all of a video clip may be sent to the LLM 130. In some embodiments, a video clip taken by the user device 150 may be processed by the user device 150 to extract image frames that are sent to the IAS 110. For example, the user device 150 may have an embedded LLM and/or other image processing logic that is used to identify frames of a video clip that include components of interest, clip the video, and/or compress the video data. In some embodiments, the image data may be preprocessed in other manners to obtain images that may more accurately be assessed by the LLM. In some implementations, the AIS 110 (e.g., the image recognition module 114) may perform a similar video analysis as discussed above with reference to the user device 150.

Next, at block 204, an index prompt is generated by the IAS 110. An index prompt, in general, allows the LLM to provide high-level guidance to the AIS 110 regarding next steps in completing a requested task or answering a user question. In an example embodiments related to vehicle inspections, an index prompt may request an output from the LLM indicating a particular aspect of the electronic inspection report associated with the image data, such as a particular vehicle component (e.g., tires, driver side, under the hood, etc.), an odometer report section of an inspection report, a vehicle registration section of an inspection report, and the like. In some embodiments, an index prompt instructs the LLM to determine whether a particular vehicle component is adequately identified in the image data, whether a specialized model is associated with the image data, and/or whether further information may be needed from the user device.

At block 206, a response from the LLM is received indicating, in this example, one of the three example outcomes noted above. In other embodiments, any number of other outcomes may be determined by the LLM, such as other possible outcomes included in the index prompt or outcomes that are determined more independently by the LLM 130.

At block 206, If the response to the index prompt from the LLM 130 indicates that further information is needed, the method continues to block 208 where a request for further information is sent to the user device 150 and/or additional information is retrieved from a data source (e.g., a data service 170) without further input from the user device 150. The request for additional information may request additional images, such as specific views, angles, detail levels, etc. of a particular vehicle component. The request for additional information may ask a question to the user that may be answered via selecting from two or more response options (e.g., that are generated by the LLM 130) or answered with text or voice input. The request for additional information may include a request for any other information that may be usable by the LLM 130 to optimize inspection of the vehicle.

At block 210, any further information requested at block 208 is received from the user device 150 and/or data services 170 and the process returns to block 204 where an updated index prompt is generated and sent to the LLM 130. The updated index prompt may include some or all of the original inspection information (e.g., from block 202) and the further information provided at block 210. In some embodiments, further information may be generated and/or otherwise provided by the IAS 110, without sending a request to the user device and 150.

At block 206, If the response to the index prompt from the LLM 130 indicates that a specialized model is associated with the image data (and/or other inspection information included with the index prompt), the method continues to block 212 where a request is sent to the specialized model identified by the LLM 130. For example, a specialized tread depth determination model may be executed if image data includes a close-up of a tire. Another example specialized model may be to perform OCR on a vehicle registration, odometer photo, or other image with text. As another example, if the image data includes an optical or machine-readable code, such as a QR code, barcode, or matrix code, a specialized model may be executed to decode information in the optical code. For example, an optical code may be associated with the vehicle, specific vehicle component, the driver, or other items associated with a vehicle inspection. Thus, identifying the specific vehicle using a QR code, for example, may allow the IAS to obtain vehicle information regarding the particular vehicle without the user providing any manual input. For example, vehicle information may be obtained from a service 170 that includes a database of vehicle identification, vehicle maintenance, vehicle knowledge base, user information, and/or other related information. The maintenance information may be used by the AIS 110 to compare a current status of the vehicle (e.g., any inspection features identified in the current inspection) with status of the vehicle after a previous inspection (e.g., any inspection features identified in the previous inspection), to determine changes in the vehicle since the last inspection.

At block 214, a response is received from the specialized model, which may then be used at block 220 to update an electronic inspection report. For example, if a tread depth model is executed, the actual tread depth returned from the specialized model may be automatically placed at the appropriate location in the electronic inspection report. In some embodiments, information added to the electronic inspection report is flagged for review or confirmation by the user. For example, the added information may be visually distinguished from information that has been provided directly from the user and/or that has already been confirmed by the user, so that the user can review the information added by the IAS 110 and confirm or reject the added information.

Returning to block 206, if the response to the index prompt indicates that a specific component is identified in the image data, the method continues to block 216 where a component prompt to the LLM 130 is generated with instructions for identifying inspection features of the particular component. For example, the component prompt may include a list of typical inspection features associated with the identified component, which may vary from one component to another. Additionally, the component prompt may include examples of specific inspection features, in the form of images or text, that have been identified in other vehicles. These examples and the list of available inspection features that may be identified in the image data focus the LLM 130 and allow the LLM 130 to provide a relevant and accurate output. In some implementations, the component prompt may return information indicating additional information that is needed from the user and/or a service 170. The response may indicate possible methods that the user may use to provide that information, such as via text or additional images. The component prompt may provide examples of specific feedback that may be provided to the user that the model can use to generate a request for further information. Thus, the component prompt may result in execution of a process to request further information, such as is illustrated in blocks 208, 210.

At block 218, a response is received from the LLM 130 indicating any inspection features identified in the image data. The inspection features may then be used to update an electronic inspection report at block 220. As noted above, any updates to the electronic inspection report may be highlighted or flagged for review by the user.

In some embodiments, more than one of the processes performed in response to the index prompt (e.g., component, specialized model, further info needed) may be performed and/or the processes may be performed multiple times prior to updating the inspection report at block 220. For example, in one implementation, the component process may be performed initially to identify a particular component and/or inspection features of the component, which may also have a specialized model associated with it. Thus, the output from the component process may indicate a specialized model process, which may be initiated by the AIS 110 prior to updating the inspection report 220 without further input from the user device 150.

In this example, the response to the index prompt may indicate that further information can be obtained from one or more external services 170, such as a domain specific knowledge base that is accessible by the AIS 110. This additional information may be obtained via RAG (Retrieval-Augmented Generation) that allows the LLM to access a vast repository of documents to retrieve relevant information that can then be used to generate more informed and accurate responses. In some embodiments, the LLM 130 may generate a function call to the domain specific knowledge base (or other external service 170) that the AIS 110 can execute to retrieve the requested information. For example, a properly formatted API call to a particular service 170 may be provided by the LLM 130, and executed by the AIS 110.

Additionally, in other embodiments the processes performed in response to the index prompt may include fewer or additional processes that are not illustrated in FIG. 2.

Figure 3B:
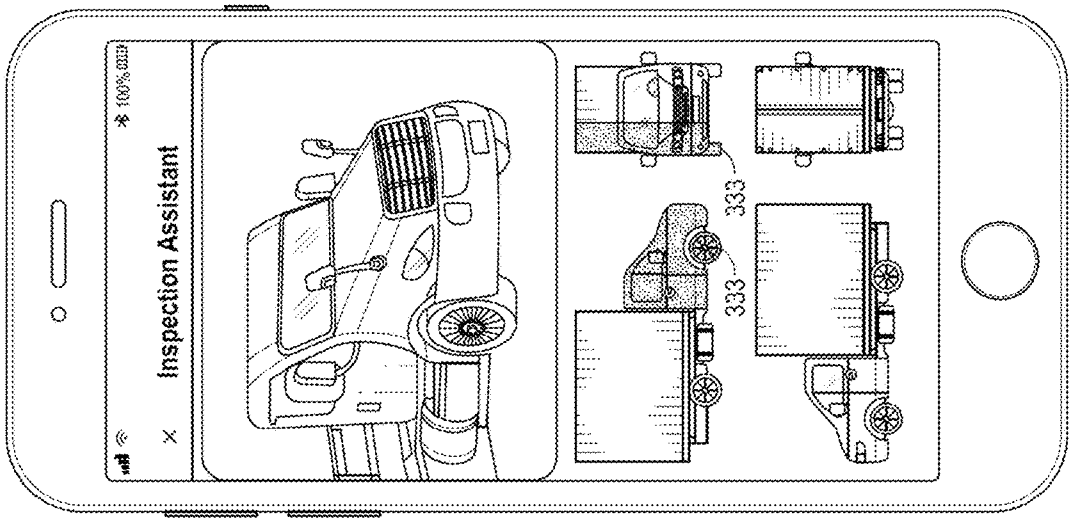
FIGS. 3A and 3B illustrate an example inspection application that is the communication with the AIS to guide performance of an inspection by a technician.
Figure 3A:
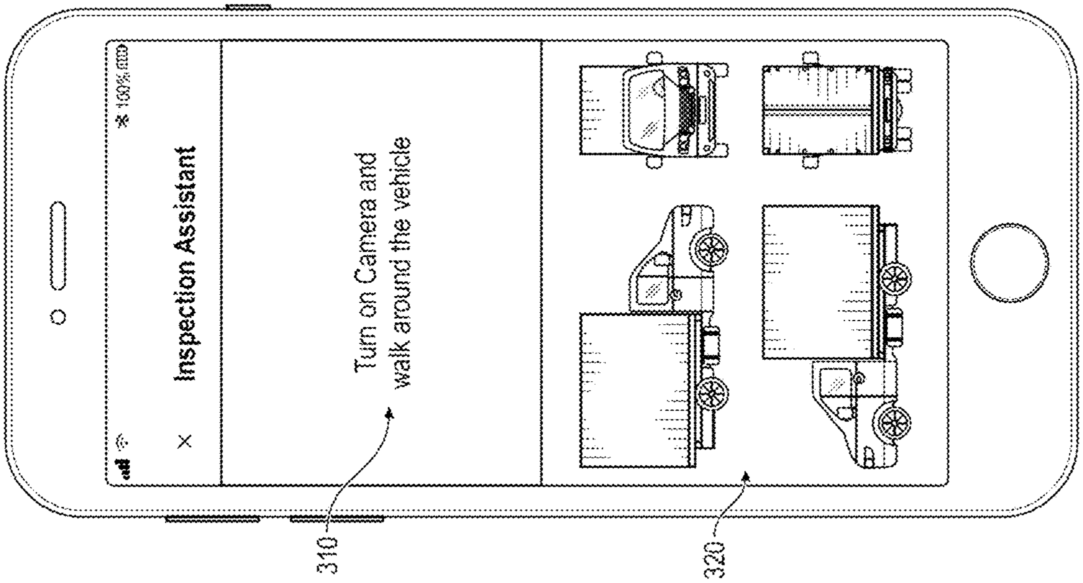

FIGS. 3A and 3B illustrates an example inspection application that is the communication with the AIS 110 to guide performance of an inspection by a technician. In FIG. 3A, the inspection is just starting with an instruction 310 to begin taking video and/or photos of different portions of the vehicle. In this example, thumbnail representations 320 of the vehicle from different angles are provided to indicate which portions of the vehicle have been adequately imaged. For example, in FIG. 3A, the vehicle components are shown in outline to indicate that none of the components have been adequately imaged (e.g., components that have been successfully processed by the LLM 130 to identify inspection features). However, once the technician turns on the camera, as is shown in the example of FIG. 3B where the live video feed 330 is displayed in the inspection application, portions of the thumbnail representations 320 are visually distinguished, in this example by coloring those portions 333 of the vehicle that have been adequately imaged. In other embodiments, other methods of visualizing components that have been adequately imaged may be used. Thus, the user is guided to the various portions of the vehicle to acquire imaging data (e.g., still images and/or video) without needing to access a written inspection report and/or manually determine portions of the vehicle that still need to be examined. In some embodiments, the thumbnail images may be updated to include additional images of areas to be photographed. For example, images of particular components, such as tires, a dashboard inside the cab of the truck, under the hood, inside the cargo container, of a license plate area, etc., may be displayed to indicate that images of those components should be acquired by the user. In some embodiments, text or even spoken instructions regarding portions of the vehicle to obtain images of, may be provided as an alternative to, or in addition to, thumbnail representation or other visualizations of those portions.

In this embodiment, video data from the user device 150 may be automatically analyzed in real-time, either by the user device 150 and/or by the AIS 110 to identify frames of the video that should be transmitted to the LLM. Thus, the user may not be required to manually identify and/or extract most relevant portions of the video data, but instead may simply keep obtaining images of the vehicle as indicated by the inspection application until all of the vehicle components are indicated as having been adequately imaged. In some implementations, video data from the user device 150 may be automatically streamed to the LLM 130, such as via the AIS 110. In this embodiment, the LLM 130 may be prompted to identify components of interest and/or inspection features of those components as the video frames are analyzed in real time (or almost real-time) by the LLM 130.

Figure 4:
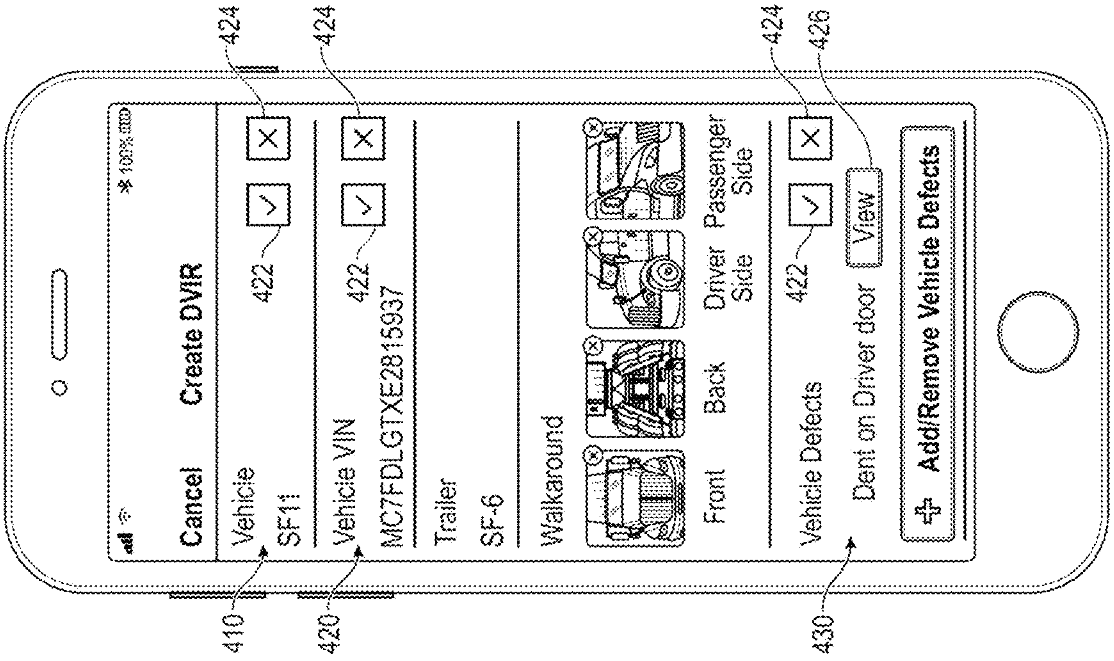
FIG. 4 is an example user interface of an inspection report that may be provided to the user after the report has been filled in with information automatically by the AIS, such as information provided via communications with the LLM.

FIG. 4 is an example user interface of an inspection report that may be provided to the user after the report has been filled in with information automatically by the AIS 110, such as information provided via communications with the LLM 130. In this example, the user is given an opportunity to confirm or reject information that was automatically populated by the AIS 110, such as a vehicle ID 410, a vehicle identification number 420, and any vehicle defects 430. In this example, the user can select a confirmation button 422 to confirm information or a reject button 424 to reject the information.

In some embodiments, if the user rejects information, the user may be asked to provide a replacement for the information. Replacement information may be provided in the same matters as discussed above, which may include the user providing the information via text or media input and/or the user invoking use of the AIS 110 to re-analyze the existing image data and/or after acquiring additional new image data that can be transmitted to the AIS 110. In the example of FIG. 4, in the defects section 430 the user is further provided an opportunity to view 426 information regarding the identified defect, which is indicated as a "Dent on Driver door" in this example. Selection of the view button 426 may, for example, cause images used by the LLM 130 to identify the defect to be displayed in the inspection application, perhaps along with an explanation of how the LLM 130 arrived at the determination of the particular defect. The user may then be provided with an opportunity to provide additional inspection information, such as additional images or explanation (e.g., text or voice) that may be added to the report, such as an addendum to the indication of the vehicle defect, and/or that may be reprocessed by the AIS 110 to confirm or update the identification of the defect.

Figure 5:
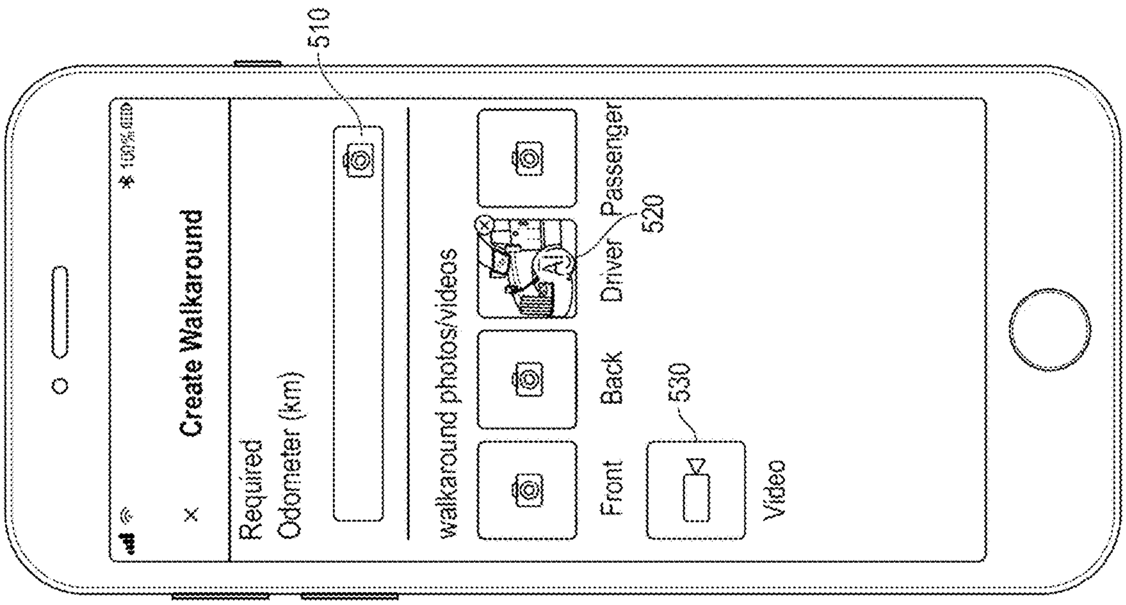
FIG. 5 is an example user interface of another embodiment of an inspection application.

FIG. 5 is an example user interface of another embodiment of an inspection application. In this example, the user is provided with specific items that the user should take photographs of, such as an odometer and different portions of the vehicle. In this example, the user can associate a photograph with a specific vehicle component. For example, by selecting the button 510, and then providing a photograph, the photograph is associated with an odometer reading and, thus, may be more efficiently processed by the AIS 110 to determine the odometer reading. In this embodiment, the user can invoke the artificial intelligence assistant by selecting a button 520 that appears after an image is added to a particular report section. In this example, the inspection information may not be transmitted to the AIS 110 until the user selects a button indicating that inspection information is ready to provide to the AIS 110. For example, selection of the button 520 may cause the inspection application to transmit the image or images of the driver side of the vehicle to the AIS 110 with an indication that those images are of the driver side of the vehicle, so that the AIS 110 may more efficiently provide instructions to the LLM 130 regarding possible inspection features to identify in the driver side of the vehicle. In this example, a video button 530 is also provided, which may be used to invoke a user interface similar to that discussed above with reference to FIGS. 3A-3B.

Figure 6:
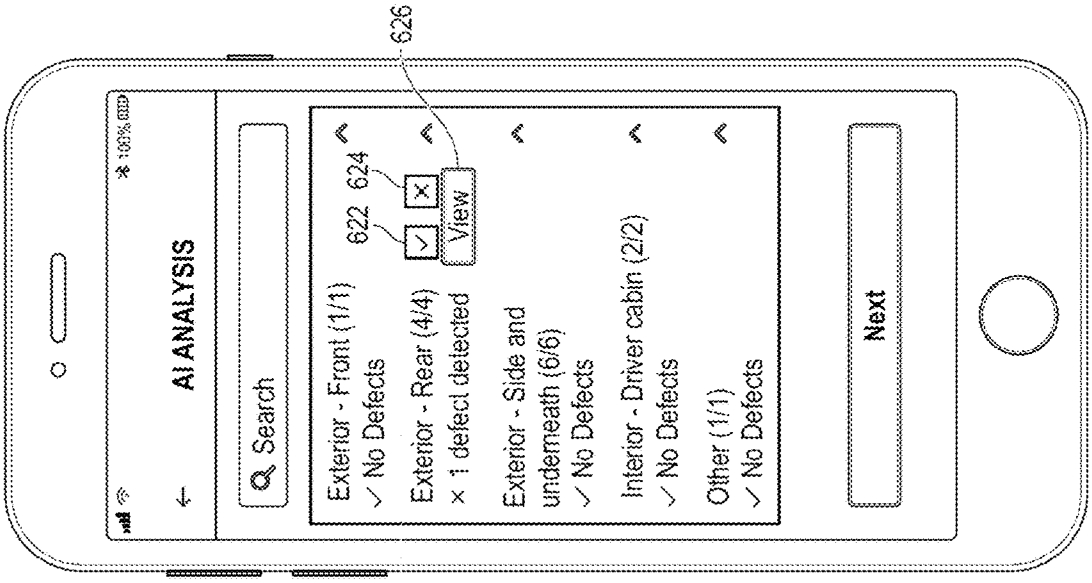
FIG. 6 is another example user interface that illustrates an overview of results of the AI analysis of inspection information provided by the user device.

FIG. 6 is another example user interface that illustrates an overview of results of AI analysis of inspection information displayed on the user device 150. This report overview 620 may be provided at the request of the user, such as at any time during an inspection process, and/or may be provided to the user at the end of the inspection process. In this example, a defect on the "Exterior Rear" has been found, and the user is provided an opportunity to confirm 622 or deny 624 the defect. The user is further provided an opportunity to view 626 further information regarding the defect, such as the images used by the AIS and/or LLM to identify the defect.

Figure 7:
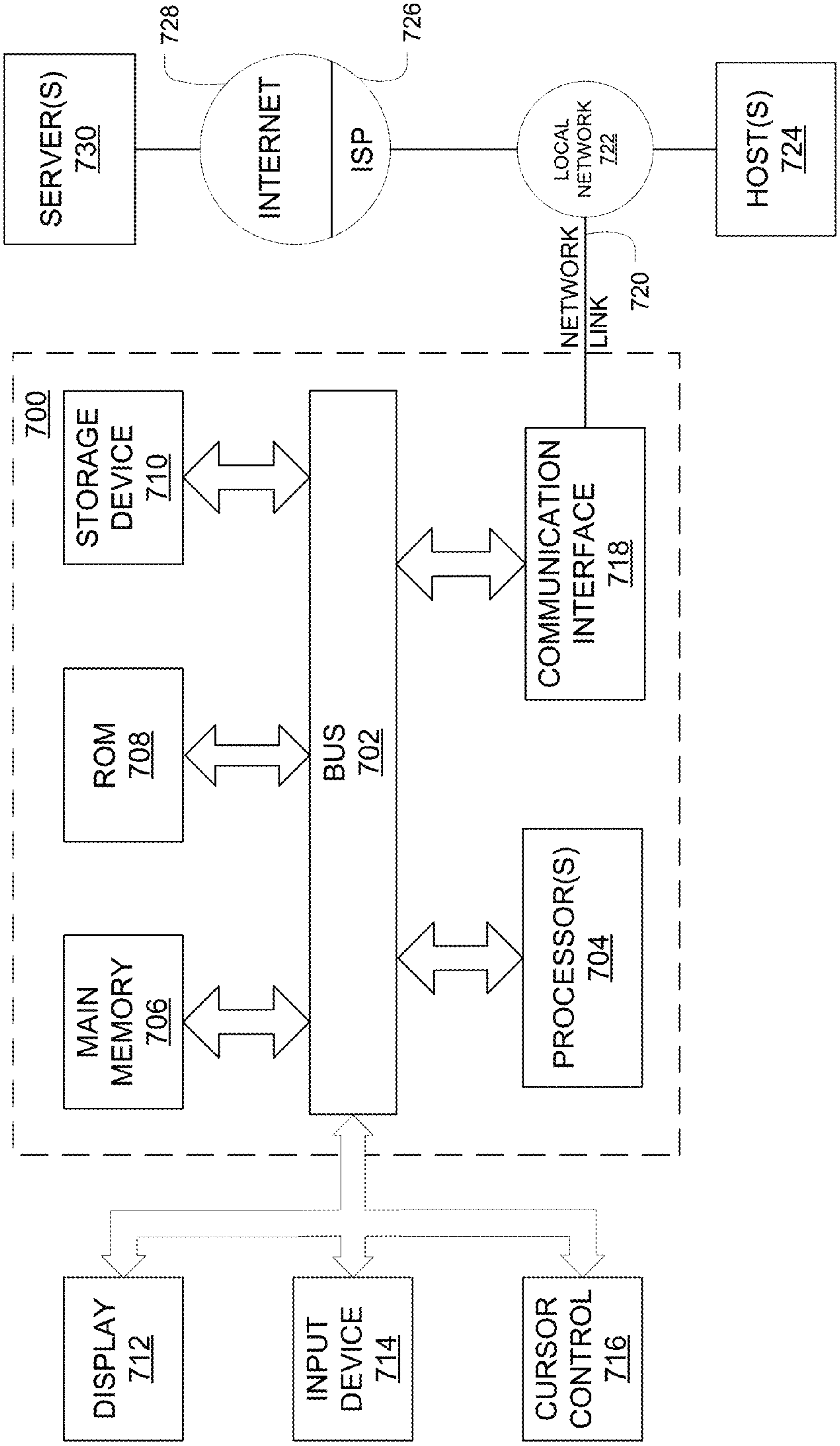
FIG. 7 is a block diagram that illustrates a computer system upon which various embodiments of the systems and/or processes illustrated in the other figures and/or discussed herein may be implemented.

FIG. 7 is a block diagram that illustrates a computer system 700 upon which various embodiments of the systems and/or processes illustrated in the figures and/or discussed herein may be implemented. For example, in various examples, the computer components of a user device 150, AIS 110, service 170, LLM 130, and/or other devices discussed herein may be implemented with some or all of the components of the example computer system 700. Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors.

Computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as computer executable program instructions that are executed by the computing device(s). Computer system 700 may further, as described below, implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more computer readable program instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

Various forms of computer readable storage media may be involved in carrying one or more sequences of one or more computer readable program instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicate with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world-wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution.

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computerized method, performed by a user device having one or more hardware computer processors and one or more non-transitory computer readable storage device storing an inspection application executable by the user device to perform the computerized method comprising:

causing to display instructions on a display of the user device for the user to obtain inspection information of a vehicle, the inspection information including an inspection video of at least a portion of the vehicle or information related to the vehicle;

causing to determine a textual prompt including textual instructions to analyze the inspection video and to identify one or more particular vehicle components included in the inspection video;

causing to transmit a prompt to a large language model ("LLM"), wherein the LLM is a multimodal LLM capable of processing at least text and image data, wherein the prompt includes at least inspection information and the textual prompt;

causing to receive a first response from the LLM indicating that additional inspection information is needed to identify a particular vehicle component in the inspection video;

causing to display instructions on the display of the user device for the user to obtain the additional inspection information;

causing to transmit an updated prompt including at least a portion of the additional inspection information to the LLM;

causing to receive a second response from the LLM identifying a particular vehicle component of the vehicle;

causing to generate a component prompt including a plurality of possible inspection features that are specifically associated with the particular vehicle component;

causing to transmit the component prompt to the LLM; and causing to receive a third response from the LLM indicating one or more inspection features of the plurality of possible inspection features that are identified by the LLM as associated with the particular vehicle component.

2. The computerized method of claim 1, wherein said causing to transmit the prompt to the large language model is initiated in response to a user input indicating that inspection information has been obtained for analysis.

3. The computerized method of claim 2, wherein the user input is provided via a hardware button of the user device or a software interface element of the inspection application.

4. The computerized method of claim 1, wherein said causing to transmit the prompt to the large language model is initiated automatically in response to the inspection video being acquired by the user device.

5. The computerized method of claim 4, wherein the inspection information includes a video stream that is periodically transmitted to the large language model.

6. The computerized method of claim 5, further comprising:

analyzing the video stream with an image processing module to detect vehicle components in the video stream; and extracting one or more still images from the video stream that include the detected vehicle component, wherein the one or more still images are included in the inspection information transmitted to the large language model.

7. The computerized method of claim 1, wherein said causing to transmit the prompt to the large language model is initiated automatically in response to the inspection information being acquired by the user device.

8. The computerized method of claim 1, further comprising:

updating an inspection report to include the one or more inspection features in associated with the particular vehicle component.

9. A non-transitory computer-readable medium storing a set of instructions that are executable by a user device having one or more processors, to cause the one or more electronic devices to perform a method, the method comprising:

displaying instructions on a display of the user device for the user to obtain inspection information of a vehicle, the inspection information including an inspection video of at least a portion of the vehicle or information related to the vehicle;

determining a textual prompt including textual instructions to analyze the inspection video and to identify one or more particular vehicle components included in the inspection video;

transmitting a prompt to a large language model ("LLM"), wherein the LLM is a multimodal LLM capable of processing at least text and image data, wherein the prompt includes at least inspection information and the textual prompt;

receiving a response from the LLM indicating that additional inspection information is needed to identify a particular vehicle component in the inspection video;

displaying instructions on the display of the user device for the user to obtain the additional inspection information;

transmitting an updated prompt including at least a portion of the additional inspection information to the LLM;

receiving a first response from the LLM identifying a particular vehicle component of the vehicle;

generating a component prompt including a plurality of possible inspection features that are specifically associated with the particular vehicle component;

transmitting the component prompt to the LLM; and receiving a second response from the LLM indicating one or more inspection features of the plurality of possible inspection features that are identified by the LLM as associated with the particular vehicle component.

* * * * *